(12) United States Patent
Dollard

(10) Patent No.: US 9,247,020 B2
(45) Date of Patent: Jan. 26, 2016

(54) MEDIA CONTENT RECEIVING DEVICE AND DISTRIBUTION OF MEDIA CONTENT UTILIZING SOCIAL NETWORKS AND SOCIAL CIRCLES

(75) Inventor: Morgan Francois Stephan Dollard, Clyde Hill, WA (US)

(73) Assignee: Google Inc., Mountain View, CA (US)

(*) Notice: Subject to any disclaimer, the term of this patent is extended or adjusted under 35 U.S.C. 154(b) by 376 days.

(21) Appl. No.: 13/569,164

(22) Filed: Aug. 7, 2012

(65) Prior Publication Data
US 2014/0046955 A1    Feb. 13, 2014

(51) Int. Cl.
G06F 7/00        (2006.01)
G06F 17/30       (2006.01)
H04L 29/08       (2006.01)
G06Q 30/02       (2012.01)
G06Q 50/00       (2012.01)

(52) U.S. Cl.
CPC ...... H04L 67/2852 (2013.01); G06F 17/30864 (2013.01); G06Q 30/0251 (2013.01); G06Q 50/01 (2013.01); H04L 67/306 (2013.01)

(58) Field of Classification Search
None
See application file for complete search history.

(56) References Cited

U.S. PATENT DOCUMENTS

| | | | |
|---|---|---|---|
| 7,873,609 B2 * | 1/2011 | Kim et al. ............... | 707/694 |
| 8,006,261 B1 | 8/2011 | Haberman et al. | |
| 8,364,540 B2 * | 1/2013 | Soroca et al. ............ | 705/14.64 |
| 2002/0002483 A1 | 1/2002 | Siegel et al. | |
| 2005/0031296 A1 * | 2/2005 | Grosvenor .............. | 386/4 |
| 2007/0061331 A1 * | 3/2007 | Ramer et al. ............ | 707/10 |
| 2008/0048973 A1 * | 2/2008 | McKay ................... | 345/156 |
| 2009/0300498 A1 * | 12/2009 | Falchuk .................. | 715/719 |
| 2010/0146553 A1 * | 6/2010 | Lo et al. .................. | 725/54 |
| 2010/0306249 A1 * | 12/2010 | Hill et al. ................ | 707/769 |
| 2010/0325125 A1 | 12/2010 | Bomfim et al. | |
| 2011/0246440 A1 | 10/2011 | Kocks et al. | |
| 2011/0289088 A1 | 11/2011 | Yarin et al. | |
| 2012/0239661 A1 * | 9/2012 | Giblin .................... | 707/741 |
| 2012/0271831 A1 * | 10/2012 | Narayanan et al. ..... | 707/741 |
| 2012/0291079 A1 * | 11/2012 | Gordon et al. .......... | 725/109 |
| 2012/0311625 A1 * | 12/2012 | Nandi ..................... | 725/28 |
| 2013/0097180 A1 * | 4/2013 | Tseng .................... | 707/748 |

OTHER PUBLICATIONS

International Search Report and Written Opinion for International Application Serial No. PCT/US13/52543, dated Nov. 29, 2013, 10 pages.

* cited by examiner

*Primary Examiner* — Kimberly Wilson
(74) *Attorney, Agent, or Firm* — Byrne Poh LLP

(57) ABSTRACT

Devices and methods for receiving sections of media content and receiving ranked content and caching sections of content are disclosed herein. Media content can be received by a device and filtered as a function of relevance to user interest. In an aspect, the device can receive sections of the content ranked based at least in part on popularity and respective sections of the media content can be cached based on the ranking. In another aspect, the device can present subset of the cached media content sections to users belonging to social circle networks and social circles.

21 Claims, 14 Drawing Sheets

MEDIA CONTENT RECEIVING DEVICE AND DISTRIBUTION OF MEDIA CONTENT UTILIZING SOCIAL NETWORKS AND SOCIAL CIRCLES

TECHNICAL FIELD

This application relates to receiving media content based at least in part on a rank associated with a subset of the media content, and caching a subset of the media content for use within at least one device.

BACKGROUND

Media users often share media content amongst groups of other users. For instance, a mother may want to share a video of her babies first steps with other members of the family. Sharing of videos captured by individuals attending a particular sporting event, wedding, music concert or birthday party, etc. by way of a social media website has also become commonplace. Users that share content in this way, share with a wide range of public users (e.g. friends, co-workers, family, etc.) audio and video content rather than with just users of a common grouping.

SUMMARY

The following presents a simplified summary of the disclosure in order to provide a basic understanding of some aspects of the specification. This summary is not an extensive overview of the specification. It is intended to neither identify key or critical elements of the disclosure nor delineate any scope of any particular embodiments of the disclosure, or any scope of the claims. Its sole purpose is to present some concepts of the specification in a simplified form as a prelude to the more detailed description that is presented later.

In accordance with one or more embodiments and corresponding disclosure, various non-limiting aspects are described in connection with the device and methods disclosed herein relating to receiving media content and caching sections of media content for consumption by users including users belonging to one or more social networks and/or social circles.

In accordance with a non-limiting embodiment, in an aspect, a device is provided comprising a memory having stored thereon computer executable components and a processor configured to execute the computer executable components stored in the memory: a filtering component that receives and filters media content as a function of relevance to user interest in media content, a rank component that receives ranking information regarding popularity of respective sections of received media content, a caching component that caches respective sections of the received media content as a function of the ranking; and a media delivery component that presents a subset of the cached media content sections.

In various aspects, the caching component caches the respective sections of the media content as a function of at least one of user demographics, user preferences, user relevance, content genre, target user, user pre-defined criteria, or inference regarding current user content preference. In another aspect, a syncing component syncs the device to a second device to effect concurrent caching of a subset of ranked media sections on device and second device, wherein device and second device respectively belong to users of a social circle. The device can further comprise an aging component that ages out from the memory cached media as a function of at least one of: age, staleness of content, lack of relevance, or lack of memory space.

Further, according to another non-limiting embodiment, presentation component causes two or more respective media sections to be concurrently displayed within different windows or picture in picture (PIP) of a display. In another non-limiting embodiment, an advertising component matches an advertisement to a respective media section based in part on similarity of content. The advertisements can also be stored on the device memory. In an aspect, a sharing component shares a subset of the cached media sections with a second device, wherein the device and the second device belong to users of a social circle network. In an embodiment, the mesh network does not utilize a public server. According to another non-limiting embodiment, the presentation component presents to user an option of receiving the entire media content or a highly ranked subset of the media content, wherein the highly ranked subset of the media content can be stored in a content delivery network device.

The disclosure further provides a method, comprising using a processor to execute computer executable instructions stored in a memory to perform the following acts: filtering received information as a function of relevance to user interest in media content, ranking received ranking information regarding popularity of respective sections of media content, caching respective sections of the media content as a function of ranking; and presenting a subset of the cached media content sections.

The following description and the annexed drawings set forth certain illustrative aspects of the disclosure. These aspects are indicative, however, of but a few of the various ways in which the principles of the disclosure may be employed. Other advantages and novel features of the disclosure will become apparent from the following detailed description of the disclosure when considered in conjunction with the drawings.

DETAILED DESCRIPTION

Figure 1:
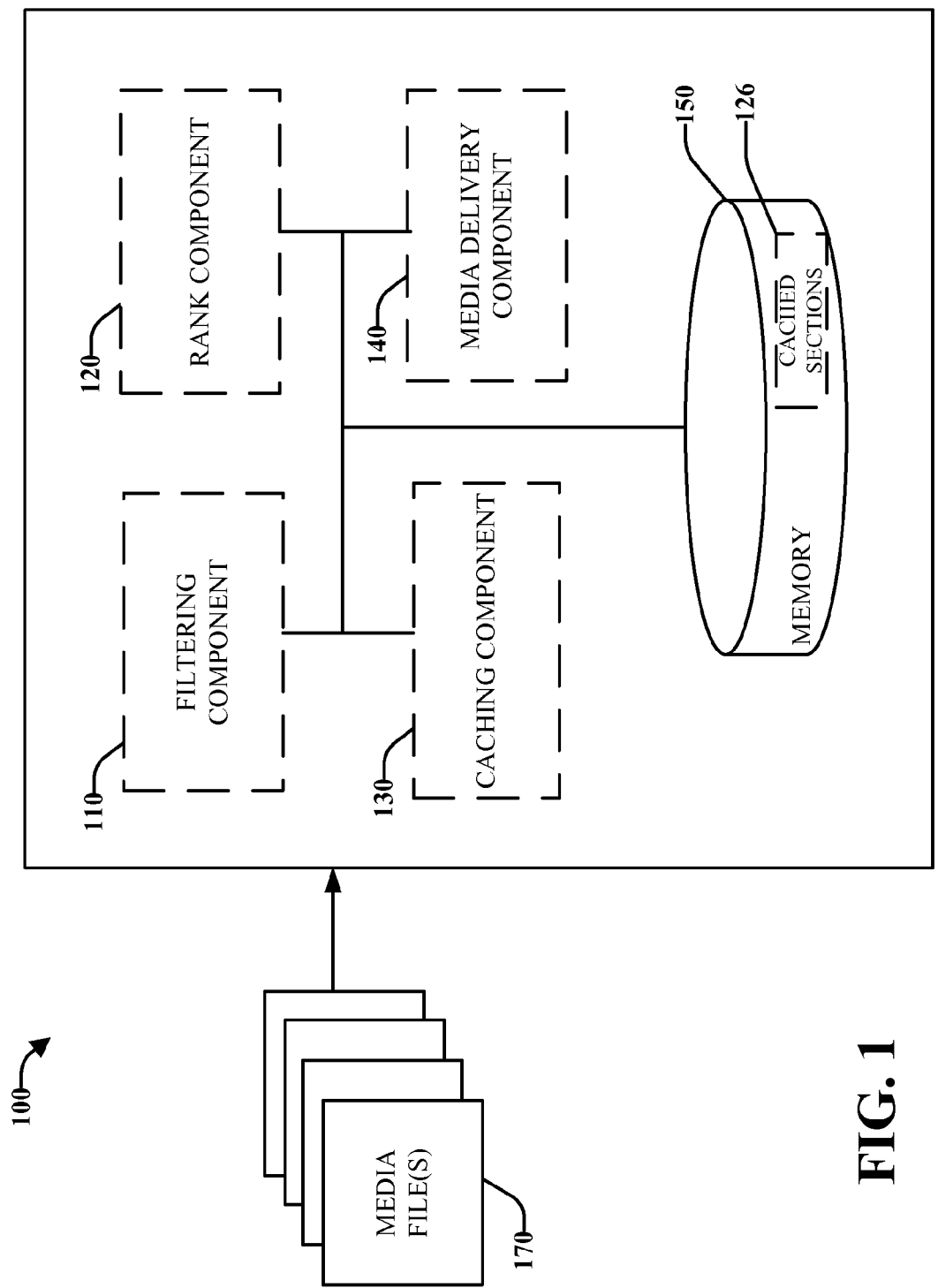
FIG. 1 illustrates an example non-limiting content receiving device for caching content sections of media files in accordance with one or more implementations.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

It is to be appreciated that in accordance with one or more implementations described in this disclosure, users can opt-out of providing personal information, demographic information, location information, proprietary information, sensitive information or the like in connection with data gathering aspects. Moreover, one or more implementations described herein can provide for anonymizing collected, received, or transmitted data.

By way of introduction, the subject matter described in this disclosure relates to a client-side media content receiving device associated with a user and configured to interact with and/or receive media. To facilitate content consumer sharing, embodiments described herein also provide for a content receiving device to distribute media content sections among users of social circles and social circle networks. The content receiving device can include any suitable computing device associated with a user and configured to interact with and/or receive media content such as a set-top box (e.g., cable box, Personal Video Recorder, video game console, and so on). The content receiving device allows one or more user to share media content sections and/or media content in entirety among users of social circles and social circle networks. A social circle is a group of socially interconnected users wherein the locus of any specific circle is defined by a single user. Furthermore, the users of a social circle are interconnected by a social relationship.

A social circle network comprises an interconnection of two or more social circles. A social circle and/or social circle relationship information for a given user may be derived from the user's contact list, other users with whom the user has exchanged email or text messages, or other users whom the user is associated in a social network service. For a given user, a social circle may be based on any of these sources or similar sources, either alone or in combination. Social circle networks can be based on any one or more social relationships between users of social circles or based on one or more specific interdependency factors between users such as friendship, common interests, hobbies, career commonalities, kinship, financial exchange, likes, dislikes, romantic relationships, gender, sexual orientation, ethnicity, culture, religious beliefs, knowledge, demographics, geographic location and other such ties between users. Collectively social constructs made up of one or more social circles and one or more social networks allows users to share content with other users with a preference to consume the content.

Content users can benefit from a device that shares media content such as home video or audio media with other users within social circles and social circle networks. For instance a user belonging to a social circle including user family and friends may share a video of his $30^{th}$ birthday party with other users within that social circle. Thus user can upload video to a cloud or server wherein another user within the social circle may access and consume the $30^{th}$ birthday party video. In some instances, when sharing media content, a user may prefer not to consume media content in its entirety. A user may prefer to consume sections of content of particular interest based in part on user preference and/or user popularity. Furthermore, via a content receiving device, a user can share media content and sections of media content through various platforms such as one or more user computers electronically coupled to a network (wide area network (WAN), such as the Internet, a local area network (LAN) or the like), desktop computer, or other computing devices such as laptop computers, handheld computers, personal digital assistants (PDAs), cellular telephones, set-top boxes or the like.

Additionally, the device provides for caching sections of media content and the caching can be a function of user demographics, preferences, relevance, genre, target user, pre-defined criteria, inference, and other user characterizations. Moreover, the caching can be part of a social circle network where certain sections are concurrently cached on devices associated with a social circle. In another aspect, the client device can include any suitable computing device associated with a user and configured to interact with and/or receive media content. For example, the content receiving device can include a desktop computer, a laptop computer, a smartphone, a tablet personal computer (PC), a PDA, or cellular phone, or other portable device. As used herein, the term user refers to a person, entity, or system that uses a content receiving device (or additional devices described herein). In an aspect, the content receiving device (or additional devices described herein) is configured to access media files via a network such as the Internet, or an intranet, or cellular service.

The device can cache media content sections and the cached media can be aged out from the memory based on time, staleness of content, lack of relevance, lack of memory space, etc. Furthermore, multiple media content sections can be cached and streamed within different windows or PIP of a screen. Additionally, targeted advertisements can be coupled to the cached content and also stored in the memory of the content receiving device. In another embodiment, cached sections or even full sections of media content (e.g. a private video) can be shared on a mesh network (e.g. a private user social circle network of family and friends) of devices only belonging to specific users (e.g. users of a social circle). This sharing ability can allow one or more users to avoid posting media content to a public server. In another aspect a user can view the cached media content section and user maintains the option, via user request, to access the full media content stored in content receiving device. Additionally, a media delivery component of the device presents a subset of the cached media content sections to at least one user.

Referring now to the drawings, with reference initially to FIG. 1, a content receiving device 100 is shown that facilitates receiving and presenting media content based on a ranking of a section of the media content and user interest. Aspects of the systems, apparatuses or processes explained herein can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. Content receiving device 100 can include memory (not depicted) for storing computer executable components and instructions. A processor (not depicted) can facilitate operation of the computer executable components and instructions by content receiving device 100.

In an embodiment, content receiving device 100 employs a filtering component 110, a rank component 120, a caching component 130, and a media delivery component 140. In an aspect, the filtering component 110 filters received information as a function of relevance to user interest in media content (e.g. media files 170), rank component 120 receives ranking information regarding popularity of respective sections of media content; caching component 130 caches respective sections of the media content as a function of the ranking, and media delivery component 140 presents a subset of the cached media content sections.

As used herein, a section of media content refers to a segment of media content of a media item that is less than the entire or whole content of the media item. A section of media content has two data points, a starting data point and ending data point where at least one of the data points does not correspond to a starting data point or an ending data point of the media item. In an aspect, the data points are referenced by a timing within a media item. For example, a media item can include two hours of video and a section of the media content of the media item can be referenced by the time 1:30:01 to 1:41:00. In another aspect, data points of a section of a media item can be referenced by media frames. For example, a media item can include frames A to Z starting with frame A and ending with frame Z. According to this example, a section of media content of the media item could include frame A to frame L, or frame X to frame Y.

Media files 170 can include media data associated with one or more data sources (not shown) that can be accessed by content receiving device 100 (and additional devices described herein). For example, a data source can include a data store storing media content and affiliated with a content provider that employs content distribution systems and services to be received by content receiving device 100. In another aspect, a data source can include a data store storing media content that is remote from a content provider and/or a content distribution service provider. In an aspect, media files can include media data as media items. For example, a media file can include one or more media items. A media item can include video and/or audio media data, including but not limited to movies, television, streaming television, video games, or music tracks).

Media files 170 may be received from any number of systems, including but not limited to, tailored media content distribution systems based on a ranking of a section of media content and user interest. The client device can receive media files from a system that monitors user interest in sections of media content, ranks respective sections of the media content as a function of the user interest, caches respective sections of the media content as a function of the ranking, and transmits a subset of the cached media content sections. The device can also receive marked, tagged, and/or cached media files from a system that marks, tags or caches media content sections of particular interest to content consumers.

According to one embodiment, content receiving device 100 includes filtering component 110 that receives and filters media content as a function of relevance to user interest in media content. As used herein, user interest in media content refers to one or more user's affinity for media content. User interest can be a function of historical, demographic, or other metrics associated with user viewing or preferences. For instance, a viewer may be a twenty-three year old male, thus filtering component 110 can filter or remove any received information regarding women cosmetic products due to the likelihood that such content is irrelevant to a twenty-three year old male user interest in such subject matter. Furthermore, filter component 110 can filter out disruptive information and/or non-functional information, including but not limited to, incorrectly formatted media content, tagged sections of media content with broken tags, scripting information that could launch viruses or spyware, spam content, content which consume excessive quantities of memory storage, and other such disruptive information.

Additionally, filtering component 110 can receive and filter media content channels in a particular category, such as movie channels or sport channels, or channels specifically selected by a user as their "favorites" channels. For instance, a user may want to receive information only related to classmates from The Ohio State University, thus user could configure the filter settings to receive information on "The Ohio State University classmate channel". Filtering component 110 may also take into account, for purposes of receiving and filtering media content, user interaction media content information generated from the source of the received information to determine relevance to user interest. In one aspect, filtering component 110 (and/or rank component 120) can consider, receive and/or filter information regarding user interaction with sections of media content that include but are not limited to, viewing a section of media content, controlling the playing of a section of a media content, bookmarking a section of media content, referencing a section of media content, communicating a section of media content, posting or storing a section of media content, or tagging or bookmarking a section of media content. For example, filtering component 110 can filter and receive information based on the number of views and/or the number of different user views of the media content in its entirety or a section of media content. Thus if user viewed content relating to Hip-Hop music videos, filter component 110 can receive and filter information relating to media content of various Hip-hop music artists.

In an embodiment, content receiving device 100, further comprises rank component 120 that receives ranking information regarding popularity of respective sections of the received media content. The received ranking information may be a ranked based at least in part on popularity of respective sections of media content. Furthermore, rank component receive ranking information that consider determined user interest. In another aspect, the rank component 120 can receive filtered information from filtering component 110 and rank such filtered information based on user popularity. The ranking component can further receive ranking information regarding a section of media content at least as a function of user interest.

As used herein, a rank refers to a priority or inferiority of a section of media content to another. In an aspect, user interest in a section of media content accounts for popularity of the section of the media content. In another aspect, user interest in a section of media content can account for a classification of user's interested in section of media content. For example, a classification of user's can include a demographic of users interested in a particular section of media content. In yet another aspect, user interest in a section of media content can account for the interests of users at a specific time of day or at a particular location. Still in another aspect, user interest in a section of media content can relate to traffic associated with a section of media content.

According to an aspect, the received ranking information regarding popularity of respective sections of content can take into account any number of popularity factors. One such factor of popularity for a section of media content may be based on the number of views. For example, rank component can receive ranking information that 85% of user's of a media item are interested in a section starting at 0:53:02 to 1:21:39. The ranking information can facilitate a user in identifying sections of media content with a greater likelihood of being consumed by a greater populous of users. In another example, rank component 120 can receive ranking information that consider time spent by a user monitoring a section of media content as a factor of popularity. In an aspect, the received ranking information can correlate popularity with a user ability to control a section of media content that include but is not limited to fast-forwarding to a section of media content, rewinding to a section of media content, replaying a section of media content, pausing a section of media content, or editing a section of media Popularity in a section of media can consider social constructs such as social circle networks and social circles as well. User often interacts with and participates in a social construct such as a social circle network or social circle. Social constructs such as these can refer to a computer network connecting entities, such as people or organizations, by a set of social relationships, such as friendship, co-worker relationships, or information exchange. Also, such social constructs can refer to a computer application or data connecting such entities by such social relationships. Rank component 120 can receive ranking information based on social construct popularity factors (i.e. popularity can consider the number of times users within a family social network posted a section of video content for a daughters graduation ceremony).

Social constructs can comprise any of a variety of suitable arrangements. A user, entity and/or member of a social construct can have a profile and that profile can represent the member in the social construct. Each user profile can contain entries, and each entry can comprise information associated with a profile. Accordingly, rank component 120 can receive ranking information that include user profile information as a popularity factor. For example, a user profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a user.

Rank component 120 can also receive ranking information based on popularity of specific categories of information, such as humor, intelligence, fashion, trustworthiness, sexiness, and coolness. A user category rank can also be contained in the users profile. Often, social constructs can grant user an option to be a fan. Fans can be other users who have indicated that they are "fans" of the user. The received ranking information can also include a user and identifiers of the fans. The received ranking information can also include the rate at which a user accumulated fans and how recently the user has acquired fans. User profiles can also exist in a business context, a business' user profile can, for example, contain a description of the business, and information about its market sector, customer base, location, suppliers, net profits, net worth, number of employees, stock performance, contact information, and other types of suitable information associated with the business.

Furthermore, rank component 120 can receive rank information that consider user login patterns to the social construct such as the frequency that the user logs in to the social construct and the user's most recent login to the social construct. Other such received ranking information can also include information about the rate and frequency that a user profile gains associations to other user profiles. If a social construct comprises advertising or sponsorship, a user profile within a social construct may contain consumer information. Consumer information may include the frequency, patterns, types, or number of purchases the user makes, or information about particular advertisers or sponsors the user has accessed, patronized, or used.

Social constructs can comprise any of a variety of suitable arrangements. An entity or user of a social circle network can have a profile and that profile can represent the member in the social construct. The social construct can facilitate interaction between user profiles and allow associations or relationships between user profiles. Associations between user profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between user profiles can be reciprocal associations. For example, a first user can invite second user to become associated with the first user and the second user can accept or reject the invitation. A user can also categorize or weigh the association with other user profiles, such as by assigning a level to the association. For example, for a friendship-type association, the user can assign a level, such as acquaintance, friend, good friend, and best friend, to the associations between the user profile and another user profile. In one embodiment, rank component 120 can receive ranking information that determines the type of association between user profiles, including, in some embodiments, the degree of separation of the association and the corresponding weight or level of the association. The rank component 120 can receive ranking information from various social construct databases to facilitate in determining associations between member profiles.

Further, rank component 120 can receive data related to profiles and communities of social constructs and also send data comprising communities and profiles to the caching component 130. In an aspect, caching component 130 caches respective sections of the received media content as a function of the ranking. The cache component 130 can be configured to receive information regarding rank of a section of media content based at least in part on popularity in that section. In an aspect, ranking as a function of popularity can apply a priority scheme to any content section of a media item. For example, for a media item, the rank component 120 can receive rank popularity information that indicates a higher rank in one section of content as compared to another section of content. In another aspect, the ranking component 120 can receive rank popularity information in a section of media content against another section of media content from different media items. For example, the ranking component 120 can receive ranking information of media content section frames HU of a first media item higher or lower than media content section frames JKL of a second media item. In yet another aspect, rankings can be multi-tiered. For example media content of a media item can be ranked against media content of another media item as a function of viewing traffic, and the media content of the media item can be ranked within each respective media content sections thereof, as a function of most viewed or accessed sections relative to other sections.

According to this aspect, rank component 120 can receive ranking information that consider user interests in a section of a media content to apply a ranking to a section of the media content. Further, rank component 120 in connection with filtering component 110 can receive filtered information that can consider determined or inferred user interest in section of media content. The rank component 120 can further receive filtered information in a section of media content as a function of user interest and/or popularity. For instance, rank component 120 may receive filtered information such as user-generated tags (i.e. bookmark with key words, user comments, user queries, etc.) or social network generation tags (i.e. groups, like's, subscriptions, etc.) to determine popularity via user interest. Thus rank component 120 may receive ranking information filtered to specifically consider individual user social construct activity. For example, the rank component 120 can receive rank sections of video content relating to cooking for a user subscribed to a Facebook page wherein users share cooking recipes.

In an embodiment, content receiving device 100 further comprises a caching component 130. Caching component 130 can cache respective sections of the received media content in memory 150 as a function of the ranking of the media content sections. In an aspect memory 150 is centralized, either remotely or locally cached, or distributed, potentially across multiple devices and/or schemas. Furthermore, memory 150 can be embodied as substantially any type of memory, including but not limited to volatile or non-volatile, solid state, sequential access, structured access, random access and so on. Caching component 130 can transparently store cached sections 126 of media content so that future requests for that data can be served faster. The cached sections 126 of media content can be duplicates of the corresponding sections of the original media content which is stored elsewhere, such as in media files 170. If the cached sections 126 are requested, the request can be served by simply reading the cache, which is comparatively faster than reading the original media files. Hence, the greater the number of requests that can be served from the cached sections 126, the faster the overall content receiving device 100 performance becomes.

By caching popular or highly ranked content sections content receiving device 100 can optimize the delivery of media content to users. For example, it can be appreciated that the cached sections 126 will likely be requested by users. Accordingly, those sections can be made available for substantially immediate access as compared to the conventional situation where the entire media content is accessed and a user is required to navigate to sections of interest. The cached segments 126 can be aged out of or persisted in the memory 150 as a function of ranking, staleness, relevance, etc.

In an embodiment, media delivery component 140 is configured to present a subset of the cached media content sections to user of the content receiving device 100. In an aspect, media delivery component 140 is configured to present cached sections 126 to users and other content consumers. The media delivery component 140 is also configured to present media stored in media files 170 to content consumers. For example, the media delivery component 140 can present cached versions of media content (e.g. cached sections) as well as media content in its entirety for user consumption through content receiving device 100. In an aspect, the media delivery component 140 can provide or filter (sometimes as a function of filtering component 110 and/or rank component 120) a subset of cached section of media content as recommendations to respective content consumers as a function of rank, user interest, user preferences, historical views, user context, user location, user queries, etc. Moreover, the media delivery component 140 can present to content consumers level of popularity of respective content sections.

In an aspect, media delivery component 140 is configured to present cached sections 126 to content consumers. The media delivery component 140 is also configured to transmit subsets of cached media content sections by predicting one or more user's affinity for a section of media content through implicit or determined assessments of user interaction with media content. The inferred user interest can be based on user interaction with media content such as user viewing content in an on-line store, number of times user views content, a record of content purchased by a user, users social network data, user bookmarks, user posts of a content section, and/or user tagging of a section of media content. For instance, a user may consistently view, browse, scroll or click video content based on comic books, thus media delivery component 140 may present sections of content of predicted user interest based on such information. If a user, consistently clicks on a family vacation video, then the media delivery component 140 can present a subset of other cached videos where other family members are displayed. The caching component 130 can cache such inferred sections of received media content for faster user access in future requests.

The media delivery component 140 is also configured to present subsets of cached media content sections as a function of determined user interest. Determined user interest in media content refers to one or more user's affinity for a section of media content explicitly determined through user interaction with media content. In accordance with a determined user interest, media delivery device 140 (via rank component 120 and/or filter component 110) utilizes disclosed information regarding what user thinks about a piece of information in order to present a subset of cached section of media content to user. For example, a user may disclose a determined user interest by rating an item on a sliding scale, ranking a collection of items from favorite to least favorite, choosing content from a finite list of content choices, user created lists of liked user content (e.g. user rates itunes music on a scale of one to four stars). By user disclosing the level of interest in media content, the media delivery component 140 can thereby suggest content sections of the same media or other similar media based on such determined user interest.

In another aspect of content receiving device 100, caching component 130 caches the respective sections of the media content based in part on at least one of: user demographics, user preferences, user relevance, content genre, target user, user pre-defined criteria, or inference regarding current user content preference and any other such characterization of sections of media content.

Caching component 130 can cache sections of media content in an orderly manner according to various characterizations. For instance, caching component 130 can cache sections of media based in part on information regarding location where user resides. Thus sections of media content which reference sports teams, weather, political issues, music artists and so on from the city of Chicago may be cached in a localized storage region by caching component 130. The caching component 130 not only caches according to user demographic (i.e. educational background, gender, relationship status, age, etc.) but also according to user preferences. A user preference is one or more attributes of content selected by a user. For example, a user preference can include a format of content (e.g. MP3), type of content interface preferred (real player, Windows Media player, etc.), display resolution, video quality, audio quality, bit rate, number of frames per second, aspect ratio, scaling formats, audio output options, display options, and other preferential information a user selects. Caching component 130 can cache sections of content based on user preference information (e.g. cache video content of hi-definition quality as per user preference).

Furthermore, caching component 130 can cache sections of content as a function of user relevance. For instance if a user seeks to select sections of content relating to live singing performances, the caching component 130 can cache sections of content relating to theatre, opera, musicals, concert series, and other such live music performances while maintaining the option to bypass dubbed music video's and other such non-live singing content. Additionally, caching component 130 can cache sections of content as a function of content genre (e.g. action movies, heavy metal music, business lectures, family home movies, etc.). In another aspect, caching component 130 can cache sections of content according to target user. A target user is a one or more recipient of sections of content that user intentionally directs the content to. If user intends to send sections of content to a specific group of users then the caching component 130 can cache sections of content for access by such group of users. For instance, caching component 130 can cache edited versions of movie segments sent from a teacher to a group of students. Similarly, user may specify user pre-defined criteria and caching component 130 can cache sections of content according to the pre-defined criteria for faster future access (i.e. user can specify to cache all songs starring or featuring a music artist).

Caching component 130 can cache respective sections of the media content based on inferred user preference to determine sections of content to cache. In an aspect, caching component 130 can cache sections of media content by making use of a user inferred intent to consume a section of content based on various user content preference factors (e.g. social network data, user generated data, etc.). For example, caching component 130 may cache sections of content with inferred information about a user with a content preference to consume NPR news media will also prefer PBS news media. Thus caching component 130 could cache sections of content from PBS news media for rapid future access.

Figure 2:
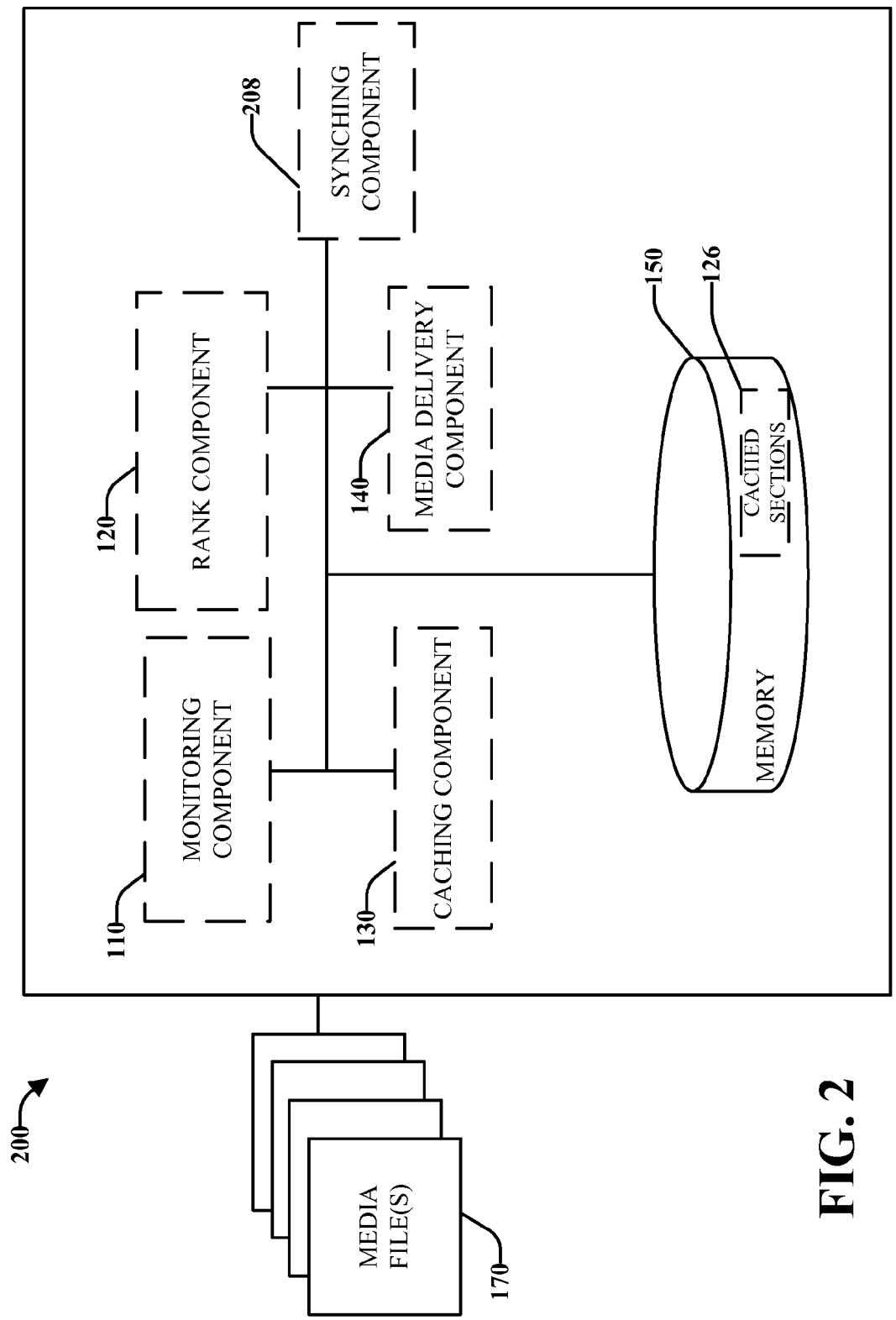
FIG. 2 illustrates an example non-limiting content receiving device for synching the device with one or more other devices in accordance with one or more implementations.

With reference to FIG. 2, presented is another exemplary non-limiting embodiment of a content receiving device 200 in accordance with the subject disclosure. In an aspect, content receiving device 200 with the addition of synching component 208 synchs the device to a second device to effect concurrent caching of a subset of the ranked media sections on the device and the second device, wherein the device and the second device respectively belong to users of a social circle. Content receiving device 200 can include the same or similar components as system 100 with the addition of synching component 208. It should be appreciated that additional features of the components of content receiving device 100, including filtering component 110, rank component 120, caching component 130, media delivery component 140, memory 150, and cached sections 126 can be provided in content receiving device 200. In addition, synching component 208 can be employed within any of the components of content receiving device 200 (and additional content receiving devices disclosed herein).

In an embodiment, synching component 208 synchronizes the content receiving device 200 to a second content receiving device 200 (and additional content receiving devices disclosed herein) to effect concurrent caching of a subset of the ranked media sections on the content receiving device 200 and the second content receiving device 200, wherein the content receiving device 200 and the second content receiving device 200 respectively belong to users of a social circle. A user of content receiving device 200 that desire to share content with one or more content receiving device 200 may synchronize the sections of media content between the content receiving device 200 and the one or more content receiving device 200 as a function of the synching component 208.

Synching component 208, besides synching sections of content between multiple content receiving devices 300, can allow multiple content receiving devices 300 to cache (sometimes as a function of cache component 130 and/or as a function of rank component 120) ranked media sections concurrently. Concurrent caching allows cached sections of content to be spread across a cluster of content receiving devices 200 and such parallel caching optimizes access efficiency for users. The synching component 208 can employ caching component 130 to store cached 126 sections of content. Users of social constructs such as social circle networks and social circles may use synching component 208 to share sections of content with other users of social constructs. Thus, user belonging to LinkedIn may share job interview video's with other users on LinkedIn by use of content receiving devices 200 as a function of the synching component 208.

The one or more sections of content to be synchronized may be ranked, pre-defined, or specified by a user. The one or more sections of content may be integrated with a browser (such as Internet Explorer from Microsoft Corporation, Firefox from Mozilla, and/or Safari from Apple Computer) that is used to view websites and web pages on an intranet and/or the Internet. The sections of content and related information that may be synched by synching component 208 may include one or more of the following: bookmarks, passwords, open tabs, open windows, cookies, user history (such as a search history for a search engine or a history of web pages visited), data for auto-completion of forms, address state, and layout information. In other embodiments, the configuration information may correspond to a portion of a toolbar (e.g., toolbar options and/or settings selected by a user) and/or at least a portion of an operating system (e.g., folder settings, security settings, search preference settings, permissions settings), such as Windows from Microsoft Corporation and/or MAC OS from Apple Computer.

In some embodiments, the synching component 208 can store a portion of the sections of content on the memory 150 and/or with cached sections 126. Updates to the stored sections of content may be provided to content receiving device 200 when the user makes changes to the sections of content. In some embodiments, at least the portion of the configuration information is stored on the content receiving device 200 when a user is not logged into a user account associated with content receiving device 200, a social circle, a social circle network, and/or when communication between the content receiving device 200 is currently unavailable (for example, if there is a network failure or the content receiving device 200 is disconnected from the network). Changes to the section of content information during such an interval that are unknown to the content receiving device 200 may be provided to the user when the user logs in to a user account of a social circle or social circle network.

In another embodiment, the rank component 120 can receive ranking sections of content and in connection with synching component 208 sync sections of content between one or more content receiving devices 200. Examples of ranking information that may be received and synched along many devices can include the type of video article, time period (e.g., time of day, or day of the week), user location (e.g., to more heavily weight video articles broadcast in close proximity to the user), selection of the video article by previous users (e.g., users querying for the same or similar terms), and whether the video article is available for playback (e.g., video articles available for playback are weighted more heavily). Also, extrinsic information can supplement a ranking. Thus, a ranking of a section of a media item can accommodate for different characteristics of content, user contexts, user interests, and perspectives of a user.

In another aspect, received ranking information can include features of sections of content as a function of weighting between one or more users of one or more content receiving devices 200. According to this aspect, the rank component 120 can further receive ranking information of a section of media content based on a ranking algorithm that weighs the characteristics and features of the media section. According to this aspect, different types of media characteristic data can have different weights and these weights can be different for different applications. For example one user may highly rank video content of a child birthday and five other users may poorly rank video content of the child's birthday. Thus such section of content among that specific social construct of five users of six users may be ranked poorly. Other media characteristic ranking factors can include length of the media content (e.g., longer sections equals better rank), quality of the media content (e.g., better quality video such as High Definition is better ranked), and sound quality (e.g., better quality is better ranked).

Figure 3:
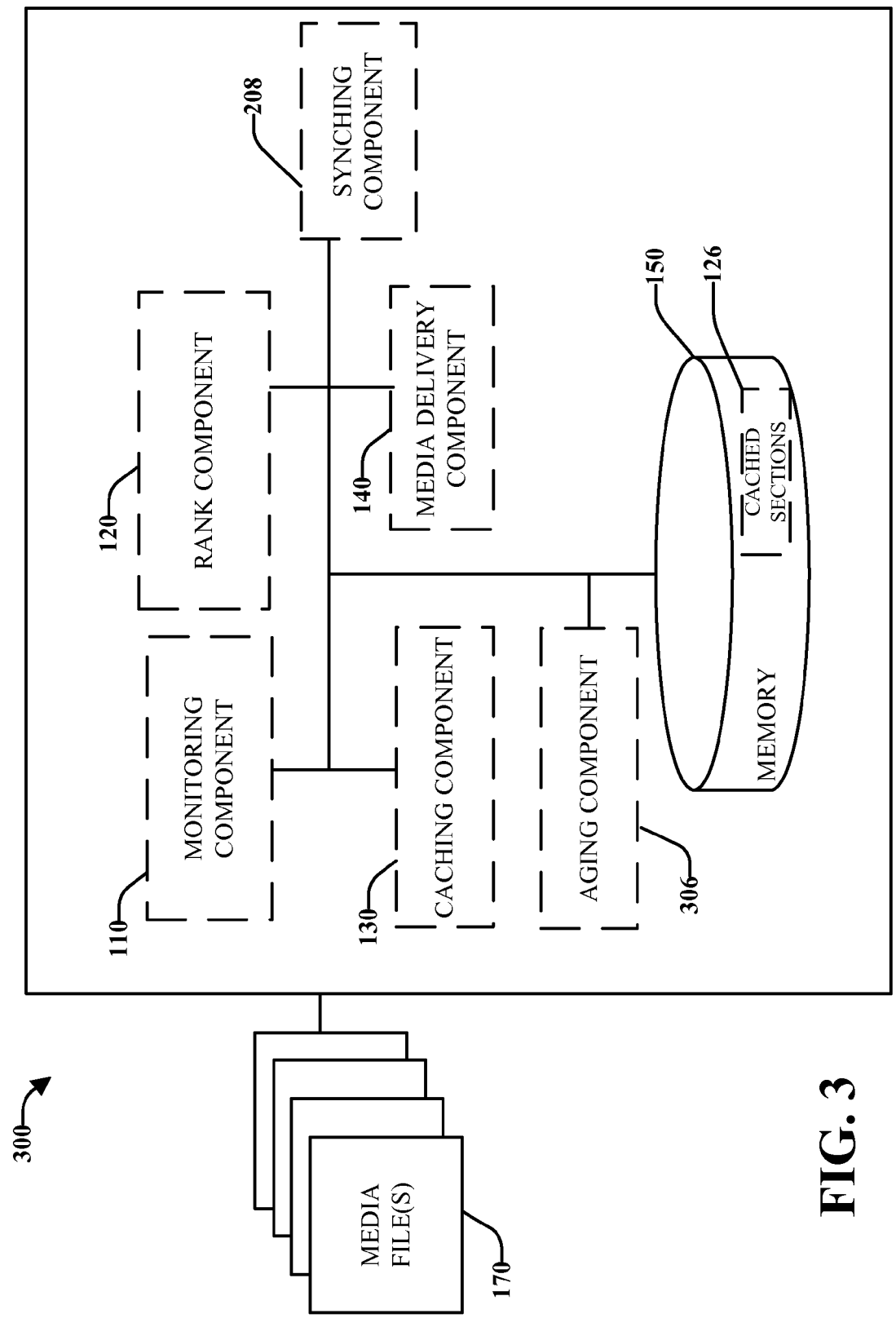
FIG. 3 illustrates an example non-limiting content receiving device for aging out cached media from the memory in accordance with one or more implementations.

With reference to FIG. 3, presented is another exemplary non-limiting embodiment of a content receiving device 300 in accordance with the subject disclosure. In an aspect, content receiving device 300 with the addition of aging component 306 that ages out from the memory 150 cached media as a function of at least one of: age, staleness of content, lack of relevance, lack of memory space. Content receiving device 300 can include the same or similar components as content receiving device 200 with the addition of aging component 306. It should be appreciated that additional features of the components of content receiving device 200, including filtering component 110, rank component 120, caching component 130, media delivery component 140, memory 150, cached sections 126, synching component 208 can be provided. In addition, aging component 306 can be employed within any of the components of content receiving device 300 (and additional content receiving devices disclosed herein).

In an embodiment, content receiving device 300 contains aging component 306 that ages out from the memory cached sections of media as a function of at least one of: age, staleness of content, lack of relevance and lack of memory space. Caching component 130 of the data center may each maintain a cache of cached sections 126 of content. This may speed up the process of locating sections of content by having locations for frequently accessed sections of content more readily available. In an aspect, aging component 306 can monitor the age of cached sections 126 through various data retention parameters or timestamps. For instance, a data retention parameter can include a parameter that specifies a maximum age (also called an age limit) of data items to be retained in cached sections 126 for storage.

Alternately stated, when a maximum age value is provided, and any of the data items stored in a cached sections 126 have an age (as indicated by the timestamps of the sections of content data) that exceeds the specified maximum age, those data items in the cell can be deleted or garbage collected. The garbage collection of sections of content data items whose age is greater than the specified age limit need not occur immediately, and thus may be performed at scheduled times or whenever the load on the cache sections 126 storage falls below a predefined level. In some embodiments, the aging component 306 can include data retention parameters that include a first parameter that specifies a maximum age and a second parameter that specifies a maximum number of section of content data items to be stored in the cached sections 126 storage area. Aging component 306 can also age out cached sections 126 remotely stored on content receiving device 300, cached sections 126 that may have never received any request for the section of content in the cached sections 126, or the corresponding section of content may be evicted from the cached section 126 by the aging component 306 due to storage limitations or staleness of the object. In some aspects, aging component 306 may age out cached sections 126 on the basis that such sections are not relevant to the sections content user accesses. For instance if user only accessed a rugby video once over two years and accessed only football videos since that time, then aging component 306 may remove the rugby section of content from cached section 126 for lack of relevance.

Figure 4:
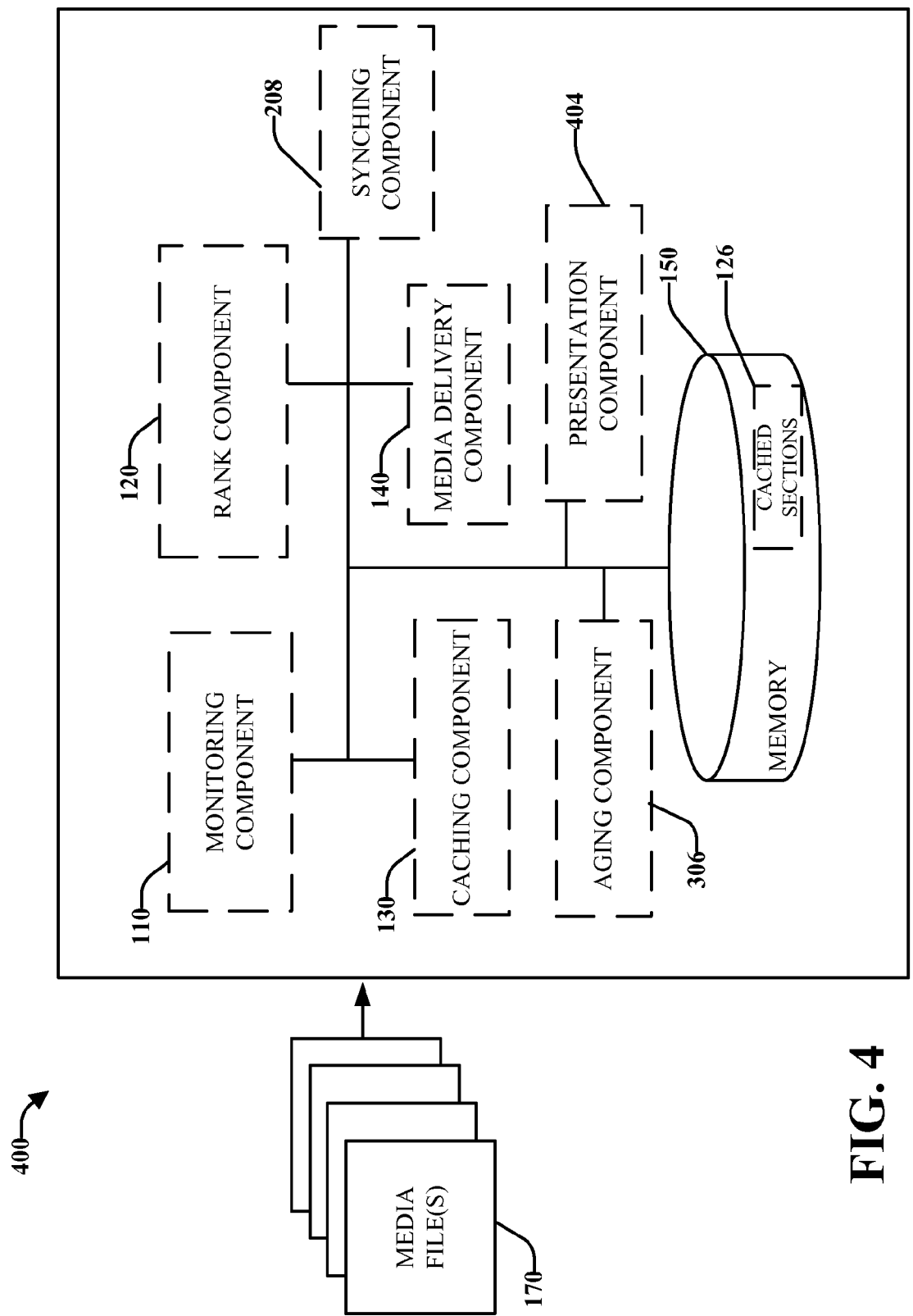
FIG. 4 illustrates an example non-limiting content receiving device for presenting sections of media concurrently in accordance with one or more implementations.

With reference to FIG. 4, presented is another exemplary non-limiting embodiment of a content receiving device 400 in accordance with the subject disclosure. In an aspect, content receiving device 400 with the addition of presentation component 404 causes two or more respective media sections to be concurrently displayed within different windows or picture in picture (PIP) of a display. Content receiving device 400 can include the same or similar components as content receiving device 300 with the addition of presentation component 404. It should be appreciated that additional features of the components of content receiving device 400, including filtering component 110, rank component 120, caching component 130, media delivery component 140, memory 150, cached sections 126, synching component 208 and aging component 306 can be provided. In addition, presentation component 404 can be employed within any of the components of content receiving device 400 (and additional content receiving devices disclosed herein).

In an embodiment, presentation component 404 causes two or more respective media sections to be concurrently displayed within different windows or picture in picture (PIP) of a display. Content receiving device 400 as a function of presentation component 404 may include a "picture in picture" view of what one or more user (i.e., synched user) is doing. For example, one embodiment provides one or more of a shared list of sections of content, sections of video, sections of audio or images (not necessarily ordered the same way for each user). As an example, the shared list of section of video or section of audio may be shown as scroll through options. The sections of content can also be shown in other forms, such as in a table format, a single section of content at a time or otherwise.

In another embodiment, presentation component 404 presents a view of remote user's screen, which may be expressed as a thumbnail of section of content, that changes as the remote user changes focus (or view) in a shared list of section of content. As described herein, a remote user refers to user of a first content receiving device 400 and a local user refers to a user of at least a second content receiving device 400. By way of example, as the remote user focuses on or selects a section of content picture, a unique section of content data identifier is transmitted by the remote user's presentation component 404 over the network to the local user's presentation component 404, which then locates the corresponding section of content on the local user's content receiving device 400 and displays it to the local user via local users presentation component 404.

In another aspect, when the presentation component 404 allows a section of content to be simultaneously viewed (or shared) by two users in conjunction with a chat, the section of content of the other user's screen is optionally automatically hidden or otherwise not displayed by use of content identifiers. A content identifier is information that allows a user to control the manner in which content is viewed by other users. By way of example, content identifiers can be transmitted between user content receiving device 400 and another content receiving device 400. A content identifier can cause the section of content of the other user's screen to be hidden, minimized, or otherwise not displayed. Furthermore, presentation component 404 allows user the ability to click the remote user's thumbnail and shift the local user's focus to the indicated picture in the remote user's thumbnail.

In another embodiment, presentation component 404 presents user the ability to turn on a "Sync" mode (sometimes as a function of synching component 208) that automatically follows the remote user's focus, updating a local user's view whenever the remote user changes its focus. The syncing process (as a function of synching component 201) thus enables the remote user to control what is displayed on the local user's display. Thus, in one embodiment, one user can (select to) view in real-time what the other user is currently viewing (to follow the other user's action with respect to shared media) and the other user may optionally disable the first user's ability to do this. Furthermore, presentation component 404 grants users the ability to save each section of content shared and/or received in a selected or designated directory or album. By way of example, the section of content can be automatically saved by the content receiving device 400 or manually and selectively saved by the user. The user can optionally specify the section of content resolution being stored or as per other user preference information.

In another aspect, presentation component 404 can present to user an option of receiving the entire media content or a highly ranked subset of the media content, wherein the highly ranked subset of the media content can be stored in a content receiving device memory 150 or cached section 126. Thus user preserves the option to choose from a variety of selections as to the section of content to consume or, in the event user desires to consume more than sections of content, the option to consume media content in entirety. For instance, user can watch a particular action sequence of a movie or choose to consume the movie in entirety as per user choice.

Figure 5:
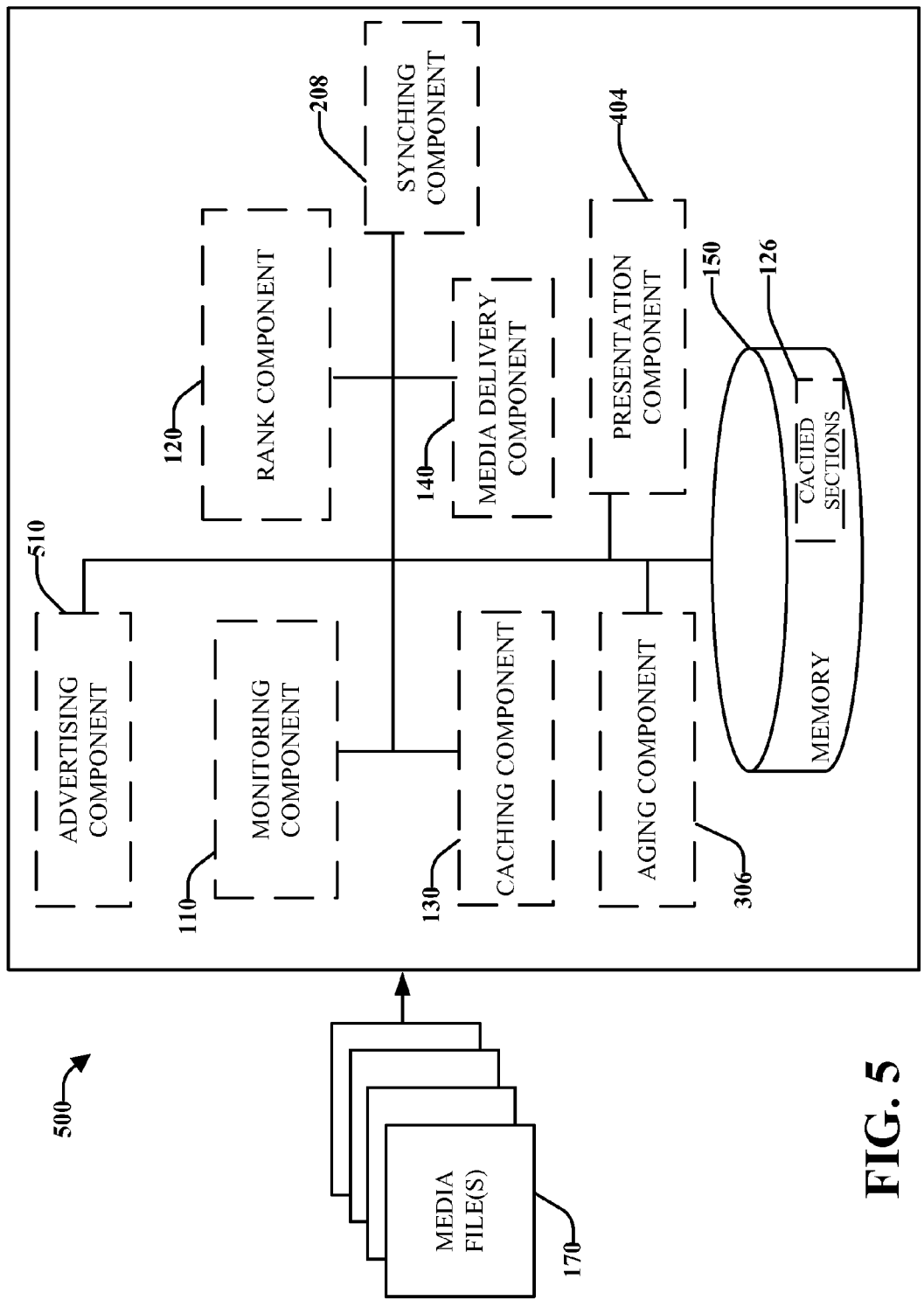
FIG. 5 illustrates an example non-limiting content receiving device for coupling advertisements to cached media sections in accordance with one or more implementations.

With reference to FIG. 5, presented is another exemplary non-limiting embodiment of a content receiving device 500 in accordance with the subject disclosure. In an aspect, content receiving device 500 with the addition of advertising component 510 that couples advertisements to cached media sections. Content receiving device 500 can include the same or similar components as content receiving device 400 with the addition of advertising component 510. It should be appreciated that additional features of the components of content receiving device 400, including filtering component 110, rank component 120, caching component 130, media delivery component 140, memory 150, cached sections 126, synching component 208, aging component 306, and presentation component 404 can be provided. In addition, advertising component 510 can be employed within any of the components of content receiving device 500 (and additional content receiving devices disclosed herein).

In an embodiment, advertising component 510 couples an advertisement to a section of content as a function of other components such as rank component 110. Advertising component 510 may select and present advertisements through a coupling process that allows advertisements to correlate to rank (as a function of rank component 120), tags, relevance of content to advertisements, and other correlation factors. For example, with respect to advertising relevance, if a high rank segment of video involves a section of a baseball game then the advertising component 510 may couple sports paraphernalia advertisements that can specifically target users sport teams according to geographical proximity to users consuming sections of content. The advertising component 510 may account for various other mechanisms for affecting the correlation between user preferences and characteristics of promotional advertisements. In an aspect, advertising component 510 can store advertisements in content receiving device 500 memory 150.

In another aspect, advertisers may directly, or indirectly, enter, maintain, and track advertisement information in the content receiving device 500. The advertisement may be in the form of graphical advertisements such as so-called banner advertisements, text only advertisements, image advertisements, audio advertisements, video advertisements, advertisements combining one of more of any of such components, etc. The advertisements may also include embedded information, such as a link, meta information, and/or machine executable instructions. Users may submit requests for advertisements to, accept advertisements responsive to their request, and provide usage information to content receiving device 500. Although not shown, other entities may provide usage information (e.g., whether or not a conversion or click-through related to the advertisement occurred) to content receiving device 500. This usage information may include measured or observed user behavior related to advertisements that have been served.

In another aspect, advertising component 510 matches an advertisement to a respective media section based in part on similarity of content. In an embodiment, advertising component 140 matches respective advertisements to ranked sections of media content. Advertising is often presented to a general audience that may include many disinterested viewers and fail to include many interested viewers. Content receiving device as a function of rank component 120 receives ranking information regarding user interest and popularity of sections of media content that can be used to match advertisements, as a function of advertising component 510, likely to have impact on particular content consumers, relevant to user interest, or likely to capture content consumer attention. The advertising component 510 can determine good matches between respective advertisements, media segments, target audience, geography, user demographics, purchasing history, etc. in order to facilitate optimizing advertising in connection with presenting sections of content.

Advertising component 140 may match advertised products and/or services based on similarity to content of media sections considering classification of sections of content. Advertising component 510 may match advertised products or services based on similarity to content of media segments considering received ranking information. Advertising component 510 may match advertised products and/or services based on similarity to content of media sections considering classification and received ranking information of sections of content. For instance, advertising component 140 can match a segment of content relating to tourism in Italy with an advertisement for a special price on a flight to Italy.

In an aspect, advertising component 510 can be configured to match an advertisement to a media segment based at least in part on similarity between context of the media segment and a product or service associated with the advertisement. As described herein, context refers to surrounding suggestion or expression that the segment of media conveys (conveyed appeal, conveyed tone, conveyed perception, conveyed meaning, conveyed sensation, conveyed emotion, etc.). In an aspect, advertising component 510 matches based on a quantification of the similarity between the context of the media segment and the product or service advertised as a function of score. In some embodiments, advertising component 510 may score the similarity between media content and advertisement based on a level of match between a list of keywords associated with a user or segment of media content consumed, and keywords associated with the advertisement. For example, if user consumes media content related to an athletic activity with a keyword in the title being "college football," a beer advertiser may associate keywords like "beer," "football," "college," "sports," and "comedy" with an advertisement. Thus the advertisement can be displayed on a search result page displaying the respective segment of media content. Advertising component 510 may account for contextual factors including, but are not limited to, genre of content, relevance to user interest, target audience, user demographics, navigation history of user, geography, social interests, and perspectives of a user.

Likewise, advertising component 510 may assign a score for similarity of context to advertisement based at least in part on user interactions associated with keywords, such as through a "tagging" process by which a submitter of media content (i.e. video) or a content consumer assign tags to the program. Advertising component 150 can match advertisements with segments of media content using such tags or keywords. For instance, advertising component 510 may match a user tagged music video in which a music artist wears designer sunglasses to an advertisement for a discount at a sun glass retail store. Furthermore, user may identify keywords as inputs for searching, commenting, and labeling segments of media content and the keywords can correlate to or advertisements likely to capture the attention of user.

Figure 6:
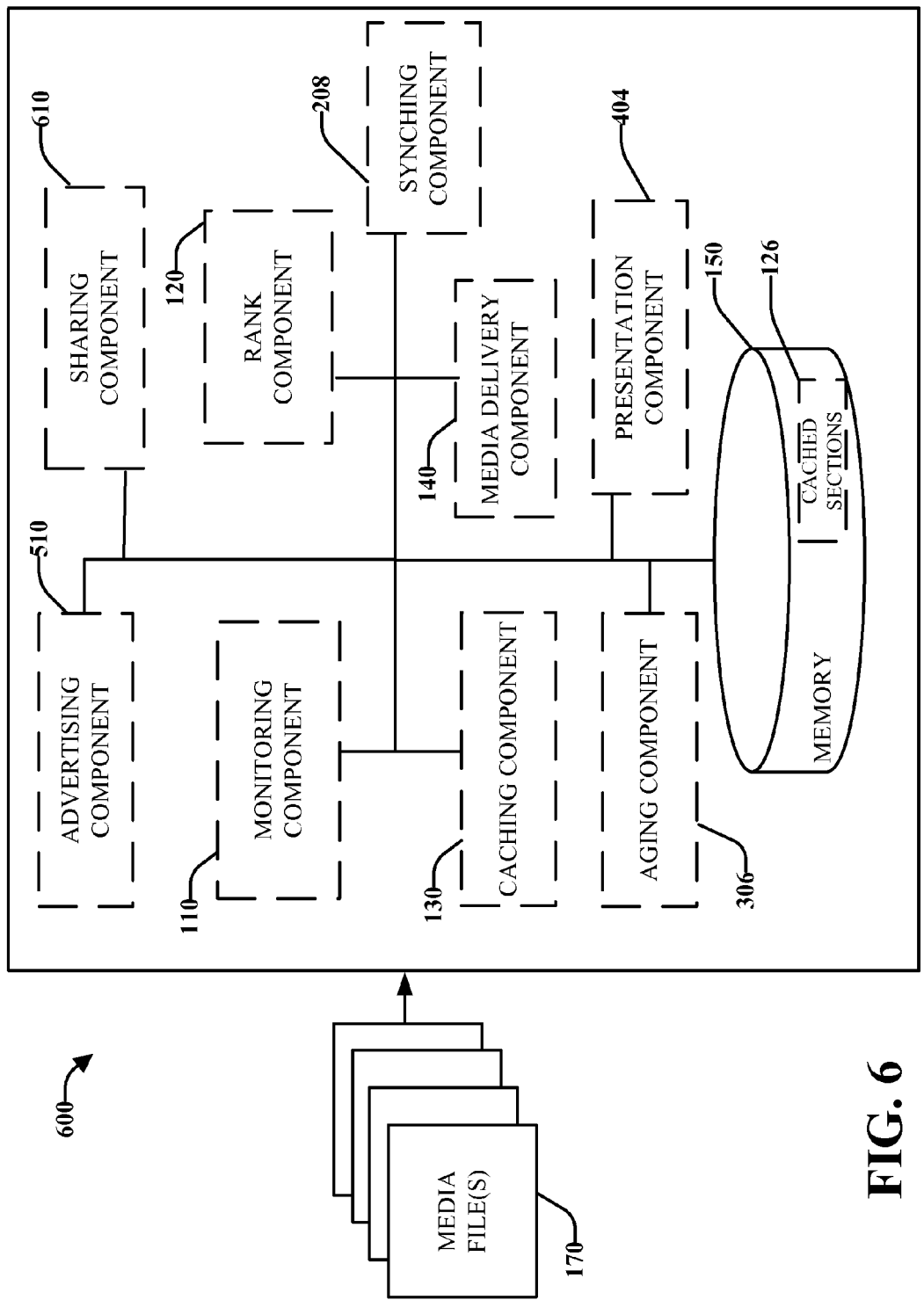
FIG. 6 illustrates an example non-limiting content receiving device for sharing sections of content among the device and at least one other device in accordance with one or more implementations.

In another embodiment, advertising component 510 matches an advertisement to a media segment based at least in part on demographics of users that deem the media segment popular. Demographics of users refers to statistical characteristics of a set of users consuming a segment of media. The statistical characteristics can include, but are not limited to, user age, gender, race, employment status, marital status, geo-location information, sexual disposition, and so on. In an aspect, advertising component 510 can match an advertisement to a media section consumed by a large set of common users, (e.g. a popular segment) belonging to one or more particular demographic characteristics. For example, when multiple users between the age of 18 and 25 repeatedly view a skateboarding video segment, advertising component 510 may match an advertisement catering to adolescent men such as a skateboarding video game. Additionally, advertising component 510 can match the advertisement to other same or similar segment of media content wherein users belonging to a particular demographic repeatedly consume content segments With reference to FIG. 6, presented is another exemplary non-limiting embodiment of a content receiving device 600 in accordance with the subject disclosure. In an aspect, content receiving device 500 with the addition of sharing component 610 that shares a subset of cached media sections with a second device, wherein content receiving device 600 and the second device belong to users of a social circle network. Content receiving device 600 can include the same or similar components as content receiving device 600 with the addition of sharing component 610. It should be appreciated that additional features of the components of content receiving device 500, including filtering component 110, rank component 120, caching component 130, media delivery component 140, memory 150, cached sections 126, synching component 208, aging component 306, presentation component 404, and advertising component 510 can be provided. In addition, sharing component 610 can be employed within any of the components of content receiving device 600 (and additional content receiving devices disclosed herein).

In an embodiment, sharing component 610 shares a subset of the cached media sections with a second device, wherein the device and the second device belong to users of a social circle network. A social circle network is a network where each node in a network captures its own data and disseminates its own data as well as collaborates with other nodes to propagate data and sections of content in the network. Sharing component 610 can share sections of content among users of a social construct (i.e. social circle, social network, etc.) over a social circle network connecting the users. Sharing component 610 can also utilize other ad hoc networks such as mobile ad hoc networks (MANET) or wireless mesh networks. Furthermore, social circle network component 610 can function without utilizing a public server in order to share section of content privately among users including users of various social constructs.

FIGS. 7-12 illustrates various methodologies and/or flow diagrams in accordance with certain aspects of this disclosure. While, for purposes of simplicity of explanation, the methodologies are shown and described as a series of acts, it is to be understood and appreciated that this disclosure is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain aspects of this disclosure. Additionally, it is to be further appreciated that the methodologies disclosed hereinafter and throughout this disclosure are capable of being stored on an article of manufacture to facilitate transporting and transferring such methodologies to computers.

Figure 7:
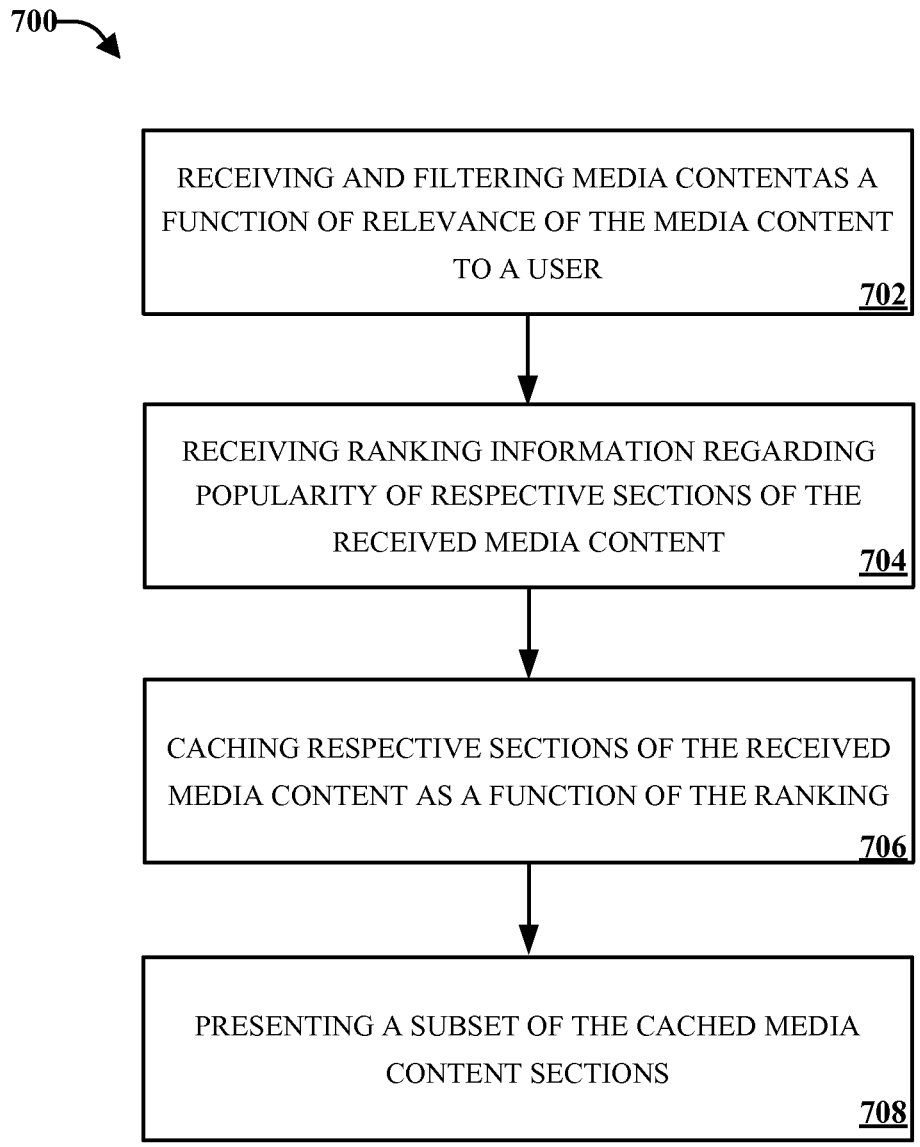
FIG. 7 illustrates an example methodology for filtering, ranking, caching and presenting media content sections in accordance with one or more implementations.

Looking now at FIG. 7, presented is a flow diagram of an example application of content receiving device disclosed herein accordance with an embodiment. In an aspect, exemplary methodology 700 of a content receiving device is stored in a memory and utilizes a processor to execute computer executable instructions to perform functions. Methodology 700 of a content receiving device receives and filters media content information as a function of relevance of the media content to user interest in media content 702; receives ranking information regarding popularity of respective sections of the received media content 704; caches respective sections of the media content as a function of the ranking 706; presents a subset of the cached media content sections 708. The content receiving device methodology 700 commences with the filtering of received information as a function of relevance to user interest in media content (i.e. media files 170).

The received and filtered information is ranked regarding popularity of respective sections of media content. Any suitable scheme for further ranking the respective sections can be employed by the content receiving device in addition to the ranking scheme in place for the content receiving device. The content can also be categorized as well as ranked within such categories. The received ranked sections of content (i.e. popular content sections) are cached, as a function of the ranking, to be made available for substantially immediate access. Cached media content sections can be presented as a subset of the cached media content sections to user and to other media content receiving devices and the cached media content sections can be stored in the memory 150 and/or cached sections 126.

Figure 8:
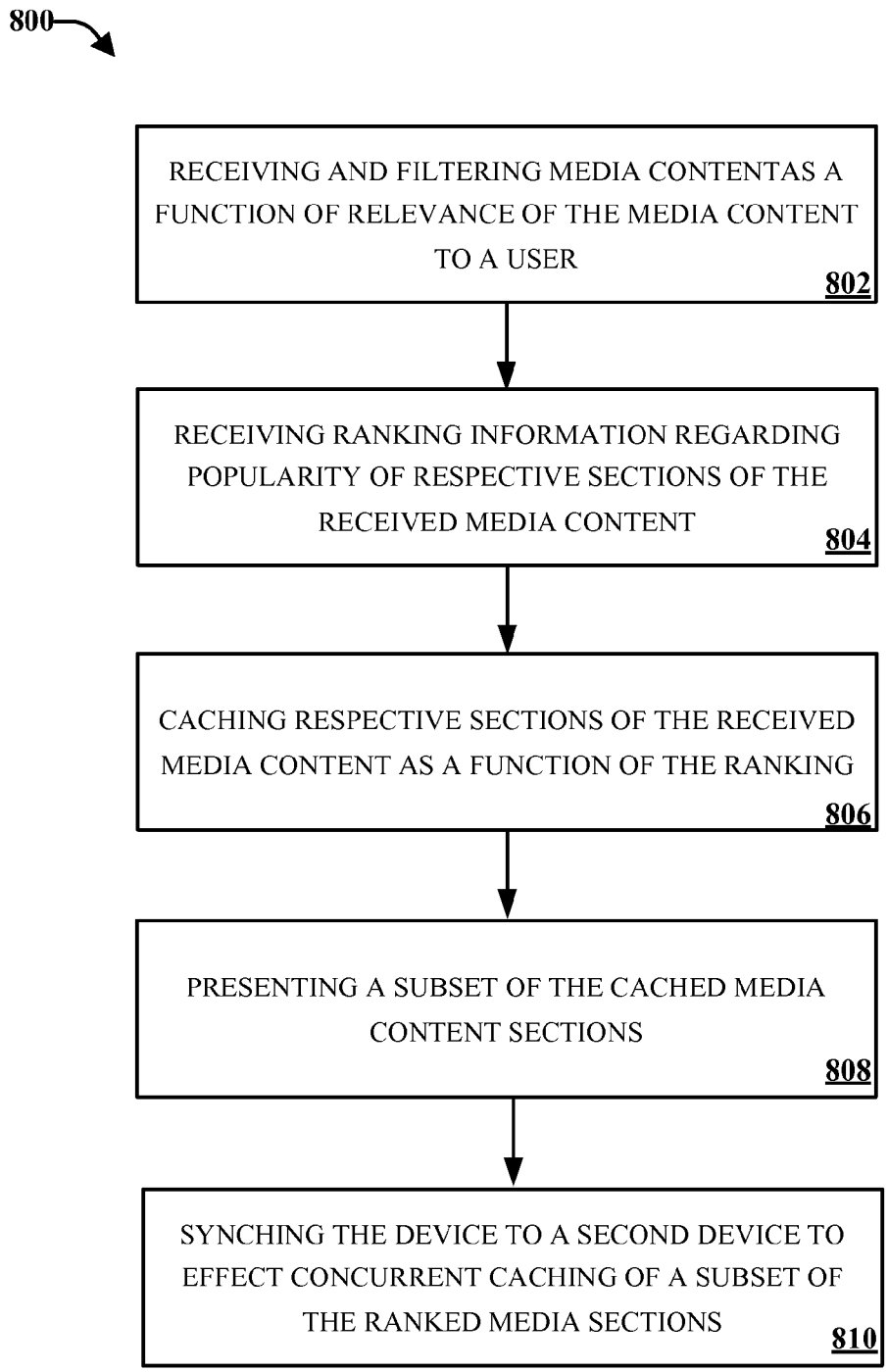
FIG. 8 illustrates an example methodology for filtering, ranking, caching presenting, and synching media content sections in accordance with one or more implementations.

Looking now at FIG. 8, presented is a flow diagram of an example application of content receiving device disclosed herein accordance with an embodiment. In an aspect, exemplary methodology 800 of a content receiving device is stored in a memory and utilizes a processor to execute computer executable instructions to perform functions. Methodology 800 of a content receiving device receives and filters media content as a function of relevance to user interest in media content 802; receives ranking information regarding popularity of respective sections of the received media content 804; caches respective sections of the media content as a function of the ranking 806; presents a subset of the cached media content sections 808; synches the device to a second device to effect concurrent caching of a subset of the ranked media sections 810. The content receiving device methodology 800 commences with the filtering of received information as a function of relevance to user interest in media content (i.e. media files 170).

Figure 9:
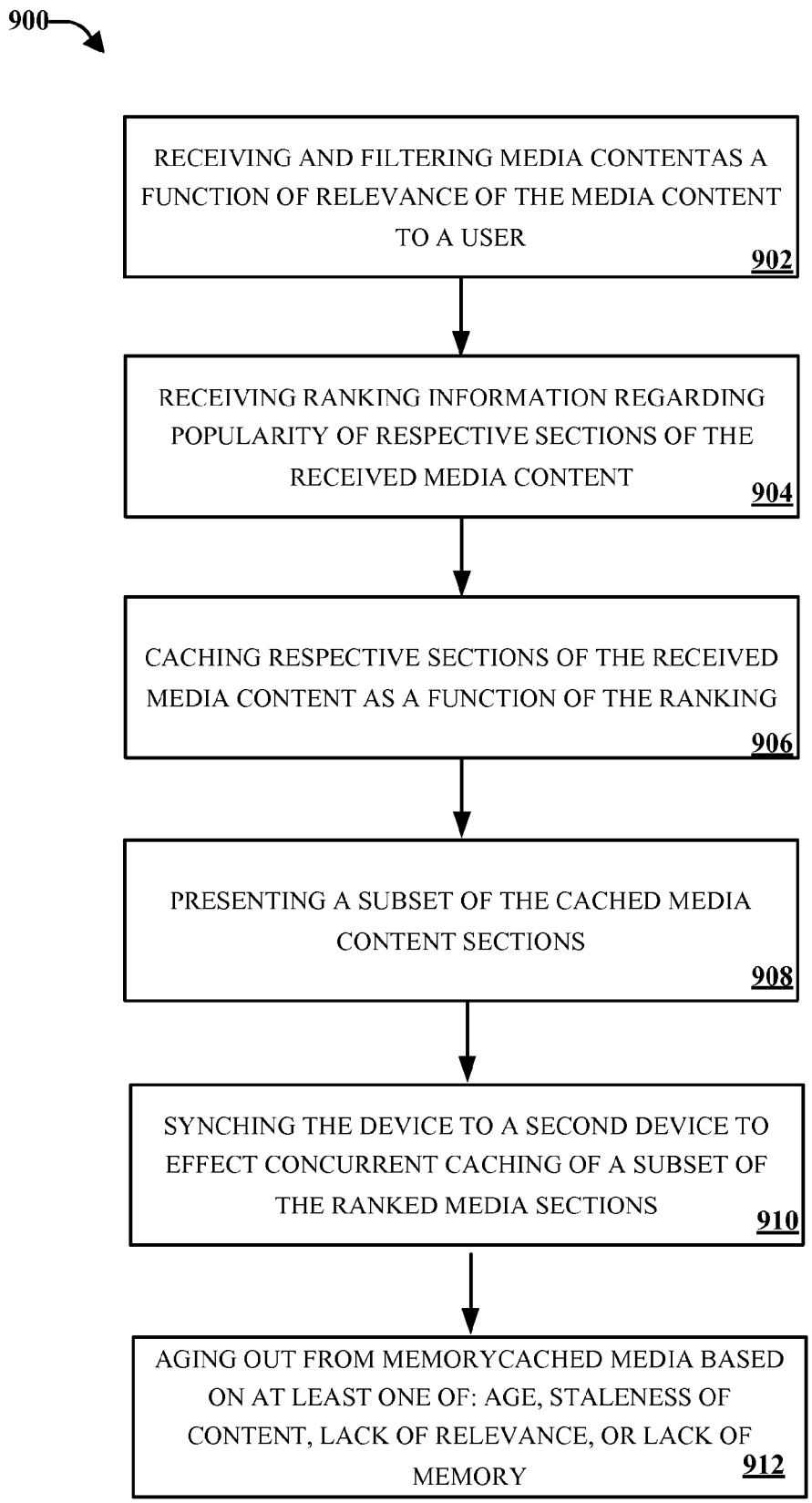
FIG. 9 illustrates an example methodology for filtering, ranking, caching presenting, synching, and aging out media content sections in accordance with one or more implementations.

Looking now at FIG. 9, presented is a flow diagram of an example application of content receiving device disclosed herein accordance with an embodiment. In an aspect, exemplary methodology 900 of a content receiving device is stored in a memory and utilizes a processor to execute computer executable instructions to perform functions. Methodology 900 of a content receiving device receives and filters media content as a function of relevance to user interest in media content 902; receives ranking information regarding popularity of respective sections of the received media content 904; caches respective sections of the media content as a function of the ranking 906; presents a subset of the cached media content sections 908; synches the device to a second device to effect concurrent caching of a subset of the ranked media sections 910; ages out from memory cached media based on at least one of: age, staleness of content, lack of relevance, or lack of memory 912. The content receiving device methodology 900 commences with the filtering of received information as a function of relevance to user interest in media content (i.e. media files 170).

Figure 10:
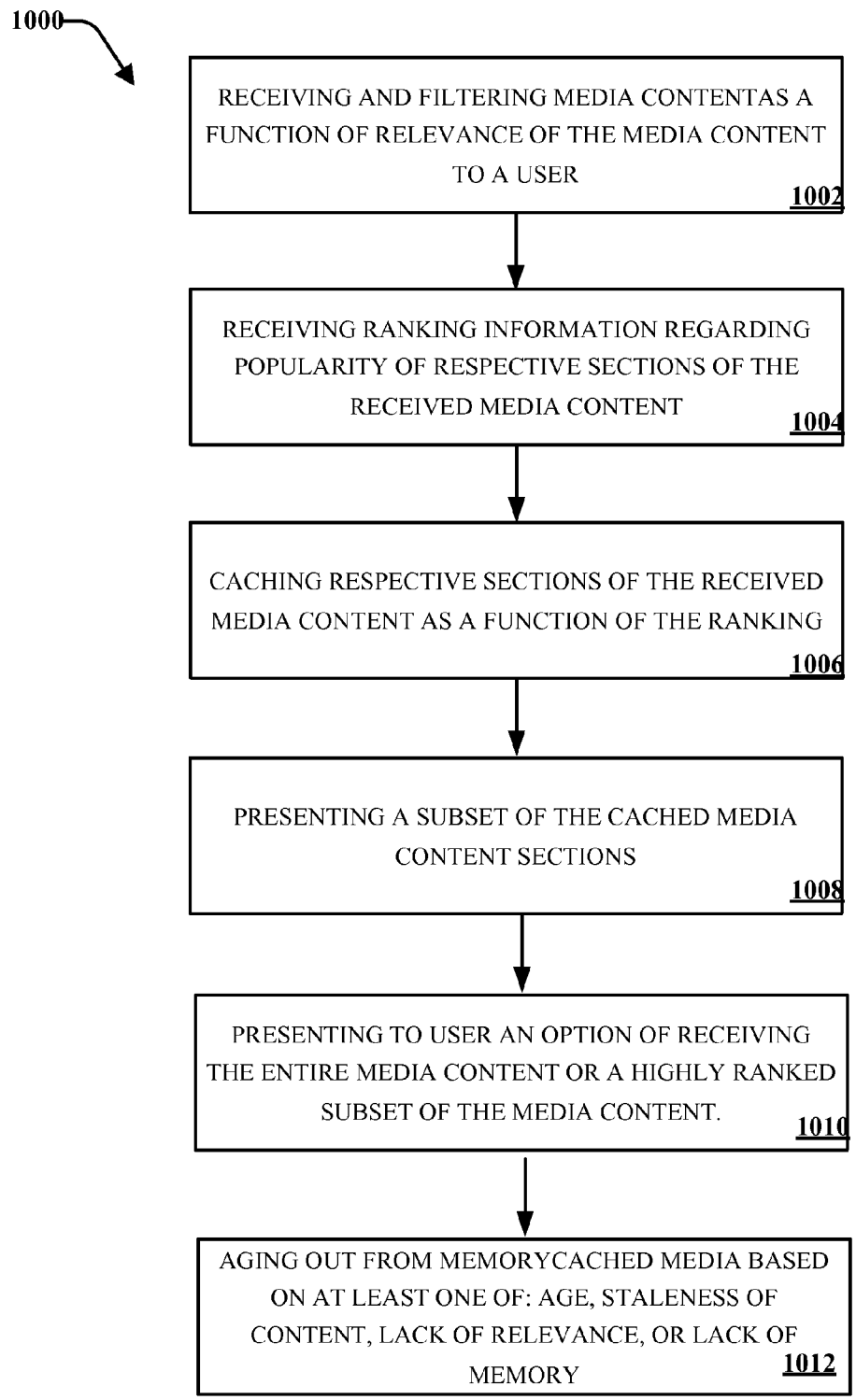
FIG. 10 illustrates an example methodology for filtering, ranking, caching presenting, synching, and aging out media content sections in accordance with one or more implementations.

Looking now at FIG. 10, presented is a flow diagram of an example application of content receiving device disclosed herein accordance with an embodiment. In an aspect, exemplary methodology 1000 of a content receiving device is stored in a memory and utilizes a processor to execute computer executable instructions to perform functions. Methodology 1000 of a content receiving device receives and filters media content as a function of relevance to user interest in media content 1002; receives ranking information regarding popularity of respective sections of the received media content 1004; caches respective sections of the media content as a function of the ranking 1006; presents a subset of the cached media content sections 1008; presenting to user an option of receiving the entire media content or a highly ranked subset of the media content 1010; ages out from memory cached media based on at least one of: age, staleness of content, lack of relevance, or lack of memory 1012. The content receiving device methodology 1000 commences with the filtering of received information as a function of relevance to user interest in media content (i.e. media files 170).

Figure 11:
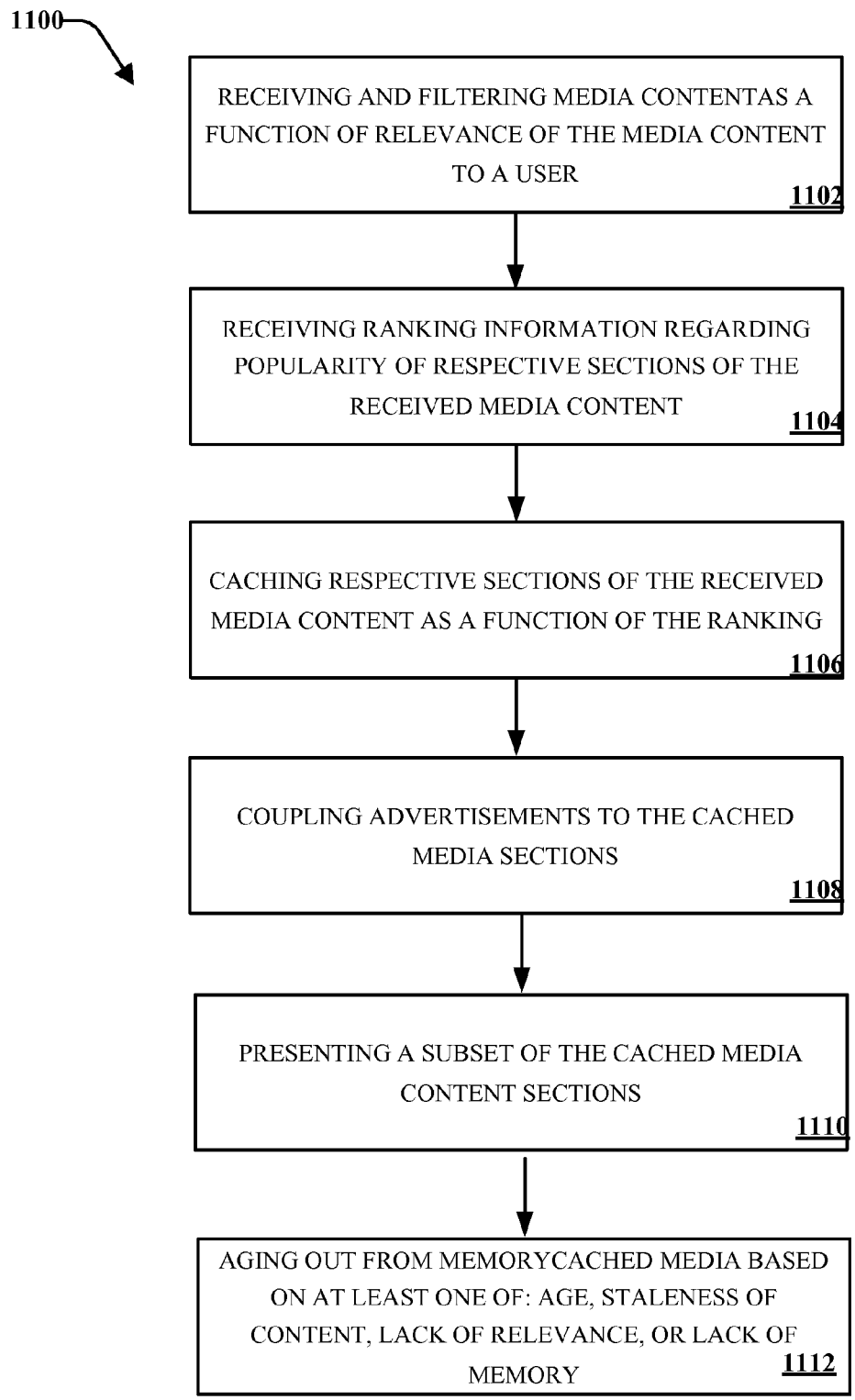
FIG. 11 illustrates an example methodology for filtering, ranking, caching presenting, coupling advertisements, and aging out media content sections in accordance with one or more implementations.

Looking now at FIG. 11, presented is a flow diagram of an example application of content receiving device disclosed herein accordance with an embodiment. In an aspect, exemplary methodology 1100 of a content receiving device is stored in a memory and utilizes a processor to execute computer executable instructions to perform functions. Methodology 1100 of a content receiving device receives and filters media content as a function of relevance to user interest in media content 1102; receives ranking information regarding popularity of respective sections of the received media content 1104; caches respective sections of the media content as a function of the ranking 1106; couples advertisements to the cached media sections 1108; presents a subset of the cached media content sections 1110; ages out from memory cached media based on at least one of: age, staleness of content, lack of relevance, or lack of memory 1112. The content receiving device methodology 1100 commences with the filtering of received information as a function of relevance to user interest in media content (i.e. media files 170).

Figure 12:
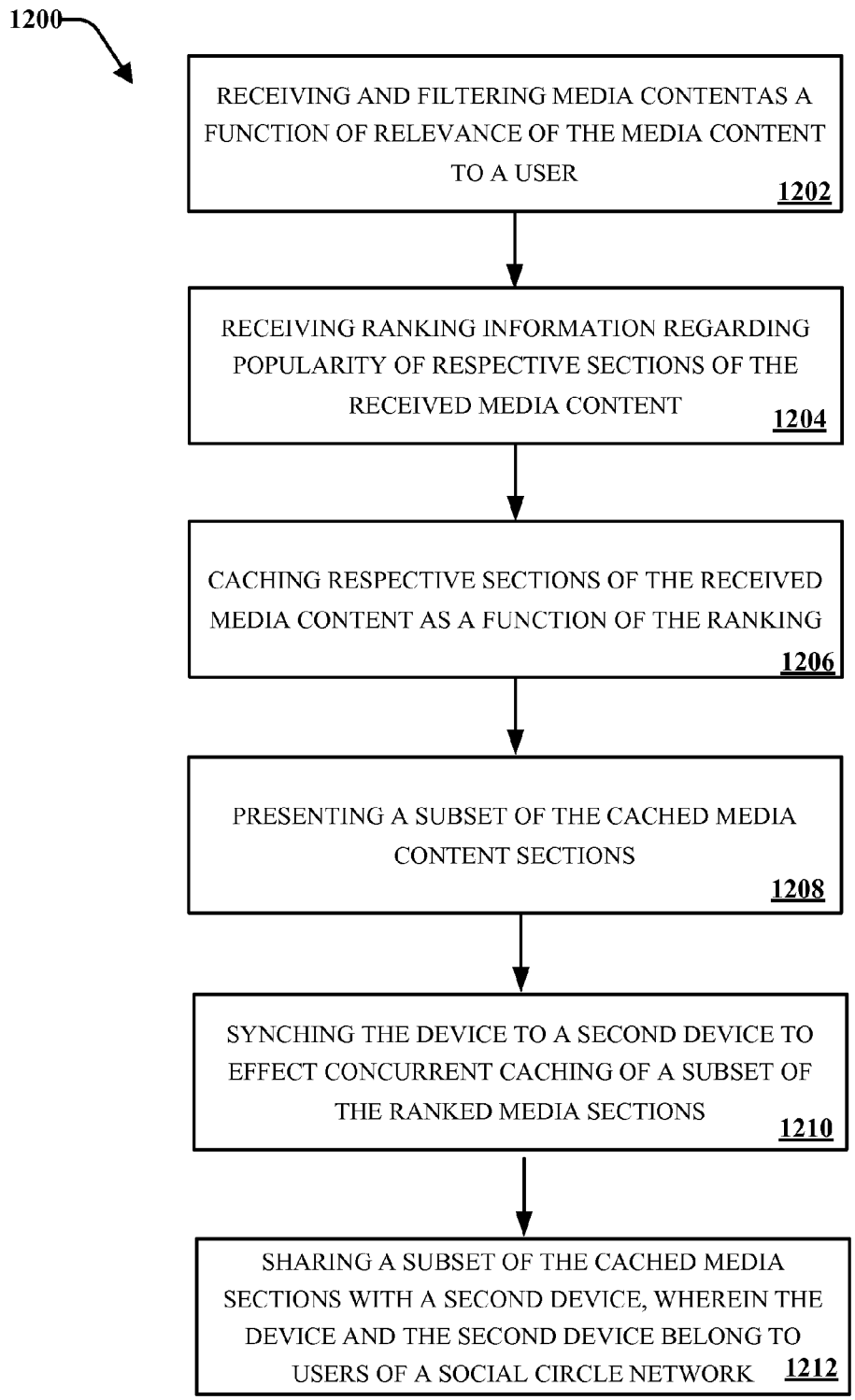
FIG. 12 illustrates an example methodology for filtering, ranking, caching presenting, synching, and sharing media content sections in accordance with one or more implementations.

Looking now at FIG. 12, presented is a flow diagram of an example application of content receiving device disclosed herein accordance with an embodiment. In an aspect, exemplary methodology 1200 of a content receiving device is stored in a memory and utilizes a processor to execute computer executable instructions to perform functions. Methodology 1200 of a content receiving device receives and filters media content as a function of relevance to user interest in media content 1202; receives ranking information regarding popularity of respective sections of the received media content 1204; caches respective sections of the media content as a function of the ranking 1206; presents a subset of the cached media content sections 1208; synches the device to a second device to effect concurrent caching of a subset of the ranked media sections 1210; sharing a subset of the cached media sections with a second device, wherein the device and the second device belong to users of a social circle network 1212. The content receiving device methodology 900 commences with the filtering of received information as a function of relevance to user interest in media content (i.e. media files 170).

In view of the exemplary content receiving devices described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 13:
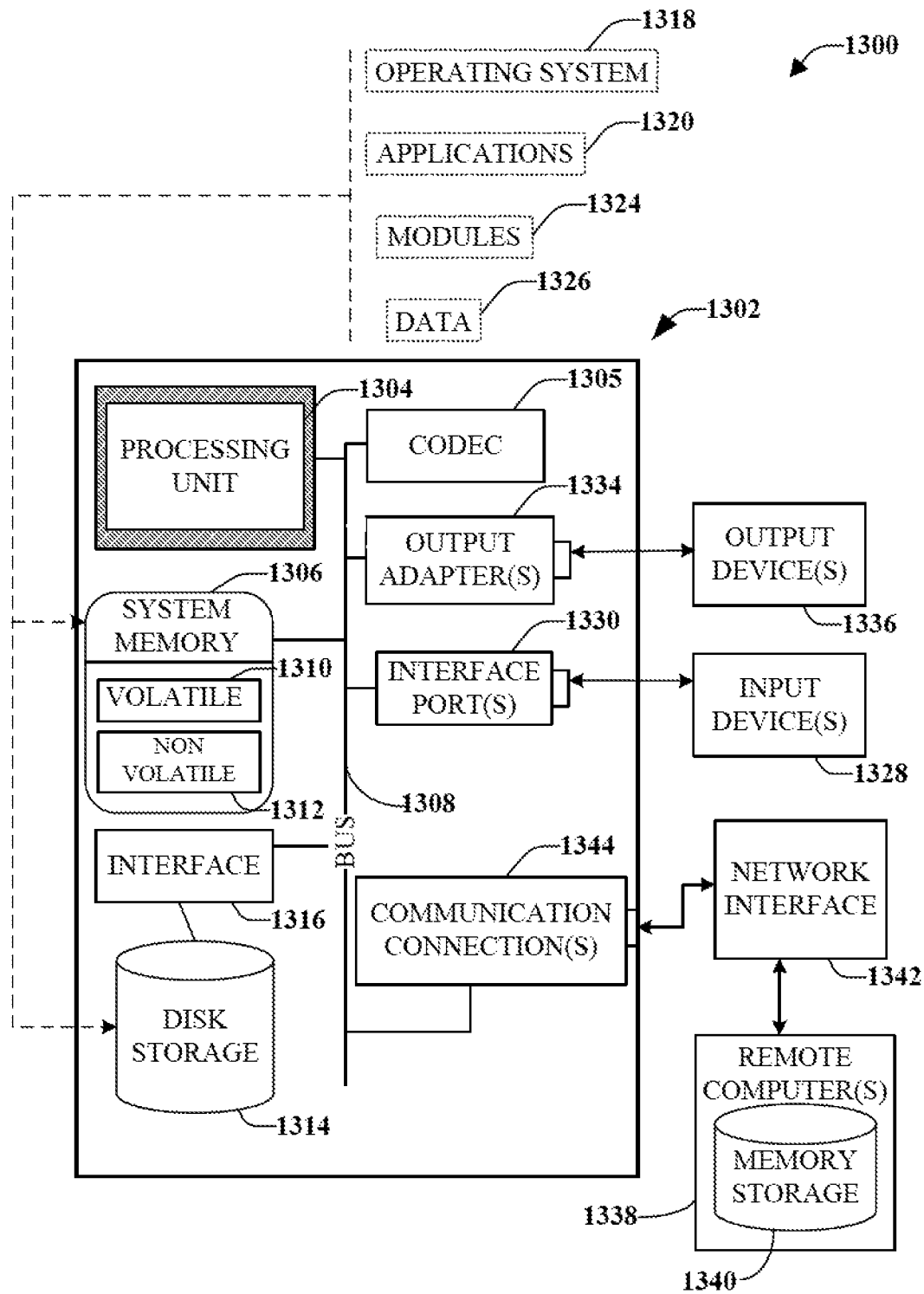
FIG. 13 is a block diagram representing an exemplary non-limiting networked environment in accordance with one or more implementations.

With reference to FIG. 13, a suitable environment 1300 for implementing various aspects of the claimed subject matter includes a computer 1302. The computer 1302 includes a processing unit 1304, a system memory 1306, a codec 1305, and a system bus 1308. The system bus 1308 couples system components including, but not limited to, the system memory 1306 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1306 includes volatile memory 1310 and non-volatile memory 1312. The basic input/output system (BIOS), containing the basic routines to transfer information between elements within the computer 1302, such as during start-up, is stored in non-volatile memory 1312. In addition, according to present innovations, codec 1305 may include at least one of an encoder or decoder, wherein the at least one of an encoder or decoder may consist of hardware, a combination of hardware and software, or software. Although, codec 1305 is depicted as a separate component, codec 1305 may be contained within non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), or flash memory. Volatile memory 1310 includes random access memory (RAM), which acts as external cache memory. According to present aspects, the volatile memory may store the write operation retry logic (not shown in FIG. 13) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1302 may also include removable/non-removable, volatile/non-volatile computer storage medium. FIG. 13 illustrates, for example, disk storage 1314. Disk storage 1314 includes, but is not limited to, devices like a magnetic disk drive, solid state disk (SSD) floppy disk drive, tape drive, Jaz drive, Zip drive, LS-90 drive, flash memory card, or memory stick. In addition, disk storage 1314 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface is typically used, such as interface 1316.

It is to be appreciated that FIG. 13 describes software that acts as an intermediary between users and the basic computer resources described in the suitable operating environment 3400. Such software includes an operating system 1318. Operating system 1318, which can be stored on disk storage 1314, acts to control and allocate resources of the computer system 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s) 1328. Thus, for example, a USB port may be used to provide input to computer 1302, and to output information from computer 1302 to an output device 1336. Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

Figure 14:
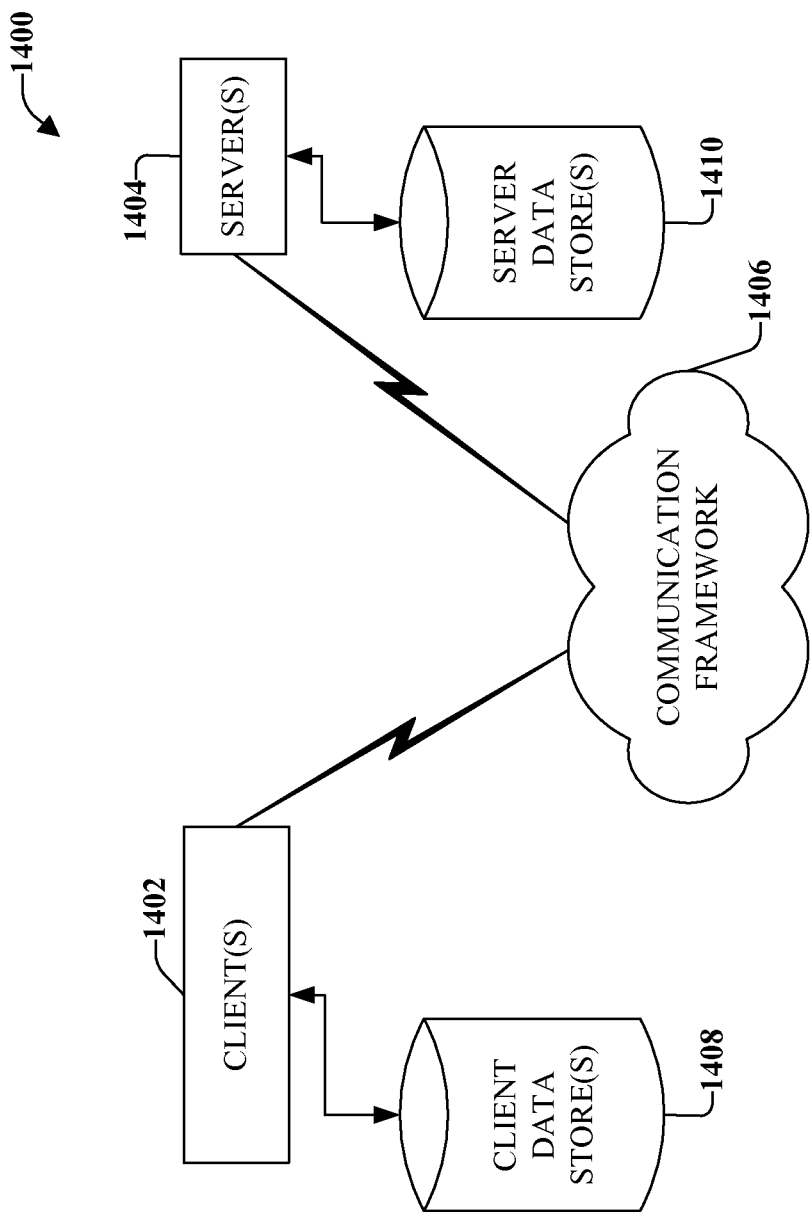
FIG. 14 is a block diagram representing an exemplary non-limiting computing system or operating environment in accordance with one or more implementations.

Referring now to FIG. 14, there is illustrated a schematic block diagram of a computing environment 1400 in accordance with this specification. The system 1400 includes one or more client(s) 1402 (e.g., laptops, smart phones, PDAs, media players, computers, portable electronic devices, tablets, and the like). The client(s) 1402 can be hardware and/or software (e.g., threads, processes, computing devices). The system 1400 also includes one or more server(s) 1404. The server(s) 1404 can also be hardware or hardware in combination with software (e.g., threads, processes, computing devices). The servers 1404 can house threads to perform transformations by employing aspects of this disclosure, for example. One possible communication between a client 1402 and a server 1404 can be in the form of a data packet transmitted between two or more computer processes wherein the data packet may include video data. The data packet can include a metadata, e.g., associated contextual information, for example. The system 1400 includes a communication framework 1406 (e.g., a global communication network such as the Internet, or mobile network(s)) that can be employed to facilitate communications between the client(s) 1402 and the server(s) 1404.

Communications can be facilitated via a wired (including optical fiber) and/or wireless technology. The client(s) 1402 include or are operatively connected to one or more client data store(s) 14080 that can be employed to store information local to the client(s) 1402 (e.g., associated contextual information). Similarly, the server(s) 1404 are operatively include or are operatively connected to one or more server data store(s) 1408 that can be employed to store information local to the servers 1404.

In one embodiment, a client 1402 can transfer an encoded file, in accordance with the disclosed subject matter, to server 1404. Server 1404 can store the file, decode the file, or transmit the file to another client 1402. It is to be appreciated, that a client 1402 can also transfer uncompressed file to a server 1404 and server 1404 can compress the file in accordance with the disclosed subject matter. Likewise, server 1404 can encode video information and transmit the information via communication framework 1406 to one or more clients 1402.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

What is claimed is:

1. A device, comprising:
   a memory having stored thereon computer executable components; and
   a processor configured to execute the following computer executable components stored in the memory:
   a caching component that caches a subset of media segments received by the device, from a media server, based on relevance of the subset of the media segments to a user of the device, popularity of the subset of the media segments amongst a group of users, and the subset of the media segments being the same as another subset of media segments concurrently cached to a second device associated with another user belonging to a same social circle as the user; and
   a media delivery component that presents the subset of the media segments via an interface of the device.

2. The device of claim 1, wherein the caching component caches the subset of the media segments based in part on at least one of: a demographic of the user of the device, or a preference of the user of the device.

3. The device of claim 1, comprising a syncing component that syncs the device to the second device to effect concurrent caching, at the second device, of one or more of the media segments included in the subset of the media segments based in part on association of the user and the other user of the second device with the same social circle.

4. The device of claim 1, comprising an aging component that ages out from the memory cached media segments based in part on at least one of: age, staleness of content, lack of relevance, or lack of memory space.

5. The device of claim 1, comprising a presentation component that causes two or more media segments of the subset of the media segments to be concurrently displayed within different windows or picture in picture (PIP) of a display of the device.

6. The device of claim 1, comprising an advertising component that couples advertisements to the subset of media segments based on relevance of the advertisements to the user of the device.

7. The device of claim 6, wherein the advertising component matches the advertisement to the subset of the media segments, respectively, based in part on similarity of content.

8. The device of claim 1, comprising a sharing component that shares a media segment of the subset of media segments with another device via a private network based on association of the user of the device and a user of the other device with a same social circle.

9. The device of claim 1, comprising a presentation component presents to the user an option of receiving, from the media server, a whole version of a media item from which a media segment of the subset of the media segments is included, in response to viewing of the media segment.

10. The device of claim 1, wherein the caching component caches the subset of the media segments based in part on a location where the user of the device resides.

11. A method, comprising:
receiving media segments from a media server, by a device comprising a processor;
caching, by the device, a subset of the media segments, based on relevance of the subset of the media segments to a user of the device, popularity of the subset of the media segments amongst a group of users, and the subset of the media segments being the same as another subset of media segments concurrently cached to a second device associated with another user belonging to a same social circle as the user; and
presenting, by the device, the subset of the media segments to the user of the device via an interface of the device.

12. The method of claim 11, further comprising caching, by the device, the subset of the media segments based in part on at least one of: a demographic of the user of the device, or a preference of the user of the device.

13. The method of claim 11, further comprising syncing the device to the second device to effect concurrent caching, at the second device, of one or more of the media segments included in the subset of the media segments based in part on association of the user and the other user of the second device with the same social circle.

14. The method of claim 11, further comprising aging out from the memory cached media segments based in part on at least one of: age, staleness of content, lack of relevance, or lack of memory space.

15. The method of claim 11, further comprising causing, by the device, two or more media segments of the subset of the media segments to be concurrently displayed within different windows or picture in picture (PIP) of a display of the device.

16. The method of claim 11, further comprising coupling, by the device, advertisements to the subset of media segments based on relevance of the advertisements to the user of the device.

17. The method of claim 16, further comprising matching, by the device, the advertisement to the subset of the media segments, respectively, based in part on similarity of content.

18. The method of claim 11, further comprising sharing, by the device, a media segment of the subset of media segments with another device via a private network based on association of the user of the device and a user of the other device via a same social circle.

19. The method of claim 11, further comprising presenting, by the device, an option of receiving, from the media server, a whole version of a media item from which a media segment of the subset of the media segments is included, in response to viewing of the media segment.

20. The method of claim 11, further comprising caching, by the device, the subset of the media segments based in part on a location where the user of the device resides.

21. A non-transitory computer-readable medium having instructions stored thereon that, in response to execution, cause a device including a processor to perform operations comprising:
receiving media segments from a media server;
caching a subset of the media segments based on relevance of the subset of the media segments to a user of the device, popularity of the subset of the media segments amongst a group of users, and the subset of the media segments being the same as another subset of media segments concurrently cached to a second device associated with another user belonging to a same social circle as the user; and
presenting the subset of the media segments to the user of the device via an interface of the device.

* * * * *